(12) United States Patent  
Dalton, Jr. et al.

(10) Patent No.: US 8,238,329 B2
(45) Date of Patent: **\*Aug. 7, 2012**

(54) METHOD AND SYSTEM FOR SECURELY AUTHORIZING VOIP INTERCONNECTIONS BETWEEN ANONYMOUS PEERS OF VOIP NETWORKS

(75) Inventors: James P. G. Dalton, Jr., Atlanta, GA (US); Dmitry Isakbayev, Cumming, GA (US)

(73) Assignee: TransNexus, Inc., Atlanta, GA (US)

( \* ) Notice: Subject to any disclaimer, the term of this patent is extended or adjusted under 35 U.S.C. 154(b) by 936 days.

This patent is subject to a terminal disclaimer.

(21) Appl. No.: 12/288,442

(22) Filed: Oct. 20, 2008

(65) Prior Publication Data

US 2009/0150984 A1 Jun. 11, 2009

Related U.S. Application Data

(63) Continuation of application No. 11/301,637, filed on Dec. 13, 2005, now Pat. No. 7,457,283.

(51) Int. Cl.
*H04L 12/66* (2006.01)
(52) U.S. Cl. ..................... 370/352; 379/220.01
(58) Field of Classification Search .......... 370/352–356; 379/112.01, 114.01–114.03, 114.28, 115.01, 379/133, 220.01, 222
See application file for complete search history.

(56) References Cited

U.S. PATENT DOCUMENTS

| | | | |
|---|---|---|---|
| 4,726,056 A | 2/1988 | An et al. | 379/115 |
| 4,979,118 A | 12/1990 | Kheradpir | 364/436 |
| 5,155,763 A | 10/1992 | Bigus et al. | 379/113 |
| 5,185,780 A | 2/1993 | Leggett | 379/34 |
| 5,251,152 A | 10/1993 | Notess | 364/550 |
| 5,325,290 A | 6/1994 | Cauffman et al. | 364/401 |
| 5,404,516 A | 4/1995 | Georgiades et al. | 395/650 |
| 5,408,465 A | 4/1995 | Gusella et al. | 370/17 |
| 5,434,848 A | 7/1995 | Chimento, Jr. et al. | 370/17 |
| 5,473,630 A | 12/1995 | Penzias et al. | 375/114 |
| 5,563,939 A | 10/1996 | La Porta et al. | 379/220 |
| 5,570,417 A | 10/1996 | Byers et al. | 379/115 |
| 5,581,544 A | 12/1996 | Hamada et al. | 370/253 |
| 5,600,794 A | 2/1997 | Callon | 395/200.01 |
| 5,606,602 A | 2/1997 | Johnson et al. | 379/115 |
| 5,633,919 A | 5/1997 | Hogan et al. | 379/115 |

(Continued)

FOREIGN PATENT DOCUMENTS

EP 0 781 015 A2 6/1997

(Continued)

OTHER PUBLICATIONS

International Search Report; PCT/US05/45013; Feb. 20, 2007.

(Continued)

*Primary Examiner* — Suhan Ni
(74) *Attorney, Agent, or Firm* — Smith Risley; Steven P. Wigmore

(57) ABSTRACT

A peering authority or settlement clearinghouse can be used to control access, collect session accounting information, and provide financial settlement of interconnect or session fees among anonymous Internet Protocol (IP) peers or networks. The addition of peering policy criteria, such as price and quality of service, to peer to peer route discovery mechanisms enable a trusted intermediary, such as the settlement clearinghouse, to authorize acceptable interconnection or peering sessions between anonymous IP peers. Any financial settlement transactions which result from the peering sessions may be subsequently executed by the settlement clearinghouse.

20 Claims, 9 Drawing Sheets

U.S. PATENT DOCUMENTS

| | | | | |
|---|---|---|---|---|
| 5,638,433 | A | 6/1997 | Bubien, Jr. et al. | 379/130 |
| 5,668,955 | A | 9/1997 | deCiutiis et al. | 379/130 |
| 5,675,636 | A | 10/1997 | Gray | 379/114 |
| 5,712,907 | A | 1/1998 | Wegner et al. | 379/112 |
| 5,740,361 | A | 4/1998 | Brown | 395/187.01 |
| 5,790,642 | A | 8/1998 | Taylor et al. | 379/112 |
| 5,799,072 | A | 8/1998 | Vulcan et al. | 379/114 |
| 5,867,495 | A | 2/1999 | Elliott et al. | 370/352 |
| 5,892,753 | A | 4/1999 | Badt et al. | 370/233 |
| 5,896,445 | A | 4/1999 | Kay et al. | |
| 5,898,668 | A | 4/1999 | Shaffer | 370/230 |
| 5,898,673 | A | 4/1999 | Riggan et al. | 370/237 |
| 5,917,891 | A | 6/1999 | Will | 379/88.03 |
| 5,917,897 | A | 6/1999 | Johnson et al. | 379/114 |
| 5,917,902 | A | 6/1999 | Saucier | 379/242 |
| 5,943,657 | A | 8/1999 | Freestone et al. | 705/400 |
| 5,966,427 | A | 10/1999 | Shaffer et al. | 379/1 |
| 5,991,373 | A | 11/1999 | Pattison et al. | 379/93.17 |
| 5,995,554 | A | 11/1999 | Lang | 375/295 |
| 6,005,925 | A | 12/1999 | Johnson et al. | 379/112 |
| 6,005,926 | A | 12/1999 | Mashinsky | 379/114 |
| 6,049,531 | A | 4/2000 | Roy | 370/260 |
| 6,067,287 | A | 5/2000 | Chung-Ju et al. | 370/232 |
| 6,085,238 | A | 7/2000 | Yuasa et al. | 709/223 |
| 6,128,280 | A | 10/2000 | Jamoussi et al. | 370/230 |
| 6,128,304 | A | 10/2000 | Gardell et al. | 370/401 |
| 6,137,869 | A | 10/2000 | Voit et al. | 379/114.01 |
| 6,157,648 | A | 12/2000 | Voit et al. | 370/401 |
| 6,178,510 | B1 | 1/2001 | O'Connor et al. | 713/201 |
| 6,205,211 | B1 | 3/2001 | Thomas et al. | 379/114 |
| 6,229,804 | B1 | 5/2001 | Mortsolf et al. | 370/352 |
| 6,233,234 | B1 | 5/2001 | Curry et al. | |
| 6,240,449 | B1 | 5/2001 | Nadeau | 709/223 |
| 6,259,691 | B1 | 7/2001 | Naudus | 370/352 |
| 6,263,051 | B1 | 7/2001 | Saylor et al. | 379/88.17 |
| 6,275,490 | B1 | 8/2001 | Mattaway et al. | 370/352 |
| 6,304,551 | B1 | 10/2001 | Ramamurthy et al. | 370/232 |
| 6,310,873 | B1 | 10/2001 | Rainis et al. | 370/356 |
| 6,339,595 | B1 | 1/2002 | Rekhter et al. | 370/392 |
| 6,345,090 | B1 | 2/2002 | Walker et al. | 379/114.12 |
| 6,366,577 | B1 | 4/2002 | Donovan | 370/352 |
| 6,404,746 | B1 | 6/2002 | Cave et al. | 370/352 |
| 6,426,955 | B1 | 7/2002 | Gossett Dalton, Jr. et al. | 370/401 |
| 6,430,282 | B1 | 8/2002 | Bannister et al. | 379/211.02 |
| 6,459,708 | B1 | 10/2002 | Cox et al. | 370/537 |
| 6,477,164 | B1 | 11/2002 | Vargo et al. | 370/356 |
| 6,487,283 | B2 | 11/2002 | Thomas et al. | 379/112.01 |
| 6,526,131 | B1 | 2/2003 | Zimmerman et al. | 379/242 |
| 6,570,870 | B1 | 5/2003 | Berstis | 370/352 |
| 6,611,519 | B1 | 8/2003 | Howe | 370/428 |
| 6,614,781 | B1 | 9/2003 | Elliott et al. | 370/352 |
| 6,615,349 | B1 | 9/2003 | Hair | 713/165 |
| 6,636,504 | B1 | 10/2003 | Albers et al. | |
| 6,658,568 | B1 | 12/2003 | Ginter et al. | 713/193 |
| 6,665,271 | B1 | 12/2003 | Thomas et al. | 370/252 |
| 6,680,948 | B1 | 1/2004 | Majd et al. | 370/401 |
| 6,707,812 | B1 | 3/2004 | Bowman-Amuah | 370/353 |
| 6,735,177 | B1 | 5/2004 | Suzuki | 370/238 |
| 6,751,652 | B1 | 6/2004 | Thomas | 709/204 |
| 6,757,823 | B1 | 6/2004 | Rao et al. | 713/153 |
| 6,765,896 | B1 | 7/2004 | Ahmed et al. | 370/338 |
| 6,795,867 | B1 | 9/2004 | Ma et al. | 709/227 |
| 6,996,093 | B2 | 2/2006 | Dalton, Jr. et al. | 370/356 |
| 7,017,050 | B2 | 3/2006 | Dalton, Jr. et al. | 713/201 |
| 7,457,283 | B2 * | 11/2008 | Dalton et al. | 370/352 |
| 2002/0101967 | A1 | 8/2002 | Eng et al. | |
| 2003/0012178 | A1 | 1/2003 | Mussman et al. | 370/352 |
| 2003/0095541 | A1 | 5/2003 | Chang et al. | 370/352 |
| 2003/0193933 | A1 | 10/2003 | Jonas et al. | 370/356 |
| 2004/0042606 | A1 | 3/2004 | Zino et al. | 379/220.01 |

FOREIGN PATENT DOCUMENTS

| | | |
|---|---|---|
| EP | 0 824 295 A2 | 2/1998 |
| EP | 0 948 164 | 10/1999 |
| GB | 2 301 264 | 11/1996 |
| WO | WO 97/14236 | 4/1997 |
| WO | WO 97/23078 | 6/1997 |
| WO | WO 98/18237 | 4/1998 |
| WO | WO 98/36543 | 8/1998 |
| WO | WO 98/37665 | 8/1998 |
| WO | WO 98/48542 | 10/1998 |
| WO | WO 99/11051 | 3/1999 |
| WO | WO 99/14931 | 3/1999 |
| WO | WO 99/14932 | 3/1999 |
| WO | WO 99/26153 | 5/1999 |
| WO | WO 00/48102 | 8/2000 |
| WO | WO 00/49551 | 8/2000 |
| WO | WO 00/52905 | 9/2000 |
| WO | WO 01/47232 A2 | 6/2001 |
| WO | WO 01/47235 A2 | 6/2001 |
| WO | WO 01/52476 A2 | 7/2001 |
| WO | WO 01/63820 A2 | 8/2001 |
| WO | WO 02/23854 A2 | 3/2002 |
| WO | WO 2005/089147 A2 | 9/2005 |
| WO | WO 2006/065789 A2 | 6/2006 |

OTHER PUBLICATIONS

AT&T Communications, Adm. Rates and Tariffs, Tariff FCC No. 1, 3$^{rd}$ Revised p. 178.69.1.

ETSI, "*Telecommunications and Internet Protocol Harmonization Over Networks (TIPHON) Release 4; Open Settlement Protocol (OSP) for Inter-Domain pricing, authorization and usage exchange*," ETSI TS 101 321, V4.1.1 (Nov. 2003) Technical Specification, pp. 49.

Hansson, Allan et al., "*Phone Doubler—A step towards integrated Internet and telephone communities*," Ericsson Review No. 4, 1997, Abstract, XP-000725693, pp. 142-151.

Johannesson, Nils Olof, "*The ETSI Computation Model: A Tool for Transmission Planning of Telephone Networks*," IEEE Communications Magazine, Jan. 1997, pp. 70-79.

Netscape Communications Corporation, "*Introduction to SSL*," Oct. 9, 1998, [Retrieved from Internet May 19, 2004], http://developer.netscape.com/docs/manuals/security/sslin/contents.htm, pp. 12.

RSA Security Press Release, "*TransNexus Integrates Industry Leader RSA Security's BSAFE Encryption Software Into Its ClearIP$^{SM}$ Clearinghouse Solution*," Oct. 21, 1999, Abstract XP-002193409, www.rsasecurity.com.

Rudkin, S. et al., "*Real-time applications on the Internet*," BT Technology Journal, vol. 15, No. 2, Apr. 1997, pp. 209-225.

Sin, Sam-Kit et al., "*A New Design Methodology for Optimal Interpolative Neural Networks with Application to the Localization and Classification of Acoustic Transients*," IEEE Conference on Neural Networks for Ocean Engineering, 1991, pp. 329-340.

The Ascend MaxVoice Gateway, "*The asnet pipeline*," Abstract XP-002096239, www.asnet.co.nz/pipeline/sum97/tamvg.html, Mar. 11, 1999.

Thom, Gary A., "*H.323: The Multimedia Communications Standard for Local Area Networks*," IEEE Communications Magazine, Abstract, XP 000636454, Dec. 1996, pp. 52-56.

TransNexus Home Page, Printed May 17, 2005, www.transnexus.com, 2 pp.

TransNexus Press Release, "*Agis and Popstar Introduce Profit-Generating Internet Fax Services to ISP Partners and Customers Worldwide*," Abstract XP-002193408, Jun. 24, 1999, www.transnexus.com, 3 pp.

Chaniotakis et al., "*Parlay and Mobile Agents in a Homogenized Service Provision Architecture*," IEEE; Universal Multiservice Networks; ECUMN 2002; 2$^{nd}$ European Conference on Apr. 8-10, 2002; pp. 150-154.

Liao, Wanjiun; "*Mobile Internet Telephony Protocol: An application layer protocol for mobile Internet telephony services*," Communications, 1999; ICC '99; 1999 IEEE International Conference; vol. 1; Jun. 6-10, 1999; pp. 339-343.

Maresca et al.; "*Internet Protocol Support for Telephony*," Proceedings of the IEEE, vol. 92, No. 9; Sep. 2004; pp. 1463-1477.

\* cited by examiner

METHOD AND SYSTEM FOR SECURELY AUTHORIZING VOIP INTERCONNECTIONS BETWEEN ANONYMOUS PEERS OF VOIP NETWORKS

PRIORITY CLAIM TO NON-PROVISIONAL APPLICATION

This application is a continuation of and claims priority to application Ser. No. 11/301,637 filed Dec. 13, 2005, now U.S. Pat. No. 7,457,283 entitled "Method and System for Securely Authorized VoIP Interconnections Between Anonymous Peers of VoIP Networks," the entire contents of which are hereby incorporated by reference.

TECHNICAL FIELD

The invention relates to video, voice, data communications and application services. More particularly, the invention relates to a system and method for securely authorizing VoIP interconnection access control between anonymous peers of VoIP networks.

BACKGROUND OF THE INVENTION

In the traditional telephone carrier operating model, calls between Local Exchange Carriers (LECs), or Retail Service Providers (RSPs) are transported by an Inter-Exchange Carrier (IXC). The RSP provides retail telephone services to its end user subscribers on its network. When a RSP end user subscriber calls a telephone number which is not in the RSP's network, the RSP will switch that call to an LXC that will transport the call to the RSP serving the called number to complete the telephone call to the receiving party. The business model for this call scenario starts with the source RSP that switches the call to the IXC. The RSP pays the IXC a fee to transport the call to the destination RSP. The IXC transports the call to the destination RSP which completes the call to the receiving party.

The IXC pays the destination RSP a fee to complete the telephone call. An important operating value added by the IXC is route discovery. The IXC manages a central routing table that enables routing among a multitude of RSPs to any telephone number on the global Public Switched Network (PSTN). This action simplifies operations for the RSP operator whom needs to route to only one IXC to obtain termination to any telephone number in the PSTN. In this document, the operating model described above is referred to as the IXC operating model.

This common telephony business model for the operating model described above is referred to as the Calling Party Pays model. The end user of the source RSP pays a retail service fee to the source RSP. The source RSP pays the IXC a fee to locate and transmit the call to the destination RSP. The IXC pays the destination RSP a termination fee to complete the call. An important aspect of this business model is the role of the IXC as the central routing and billing intermediary among many RSPs. Source and destination RSPs do not have commercial interconnect agreements with one another.

An important commercial value added by the IXC is the clearing of calls (routing and access control) between RSPs, accounting of interconnected calls and settlement of interconnect fees to ensure the destination RSP receives a share of the revenue compensation as expected in the Calling Party Pays business model. Each RSP has a single bilateral interconnect agreement with the IXC which eliminates the costly need for commercial bilateral agreements with every other RSP.

Relative to the conventional IXCs, a new communications model has evolved: The increasing use of Voice over IP (VoIP) communications has made possible a new operating model referred to as the Peer To Peer operating model. The Peer To Peer operating model differs from the IXC operating model because end to end routing and signaling for telephone calls is achieved directly from the source RSP (peer) to the destination RSP (peer) without the need for a central intermediary such as an IXC. Two examples of the Peer To Peer operating model are DUNDi and ENUM. DUNDi (Distributed Universal Number Discovery, www.dundi.com) enables source networks (peers) to discover routes to destination networks (peers) without the need for a central routing directory or intermediary signaling point.

ENUM is the Internet Engineering Task Force (www.itef.org) protocol (RFC 2916) which defines how a source peer may resolve telephone numbers into IP addresses in order to route and signal a VoIP call directly to the destination network (peer). In other words, ENUM is a standard adopted by the Internet Engineering Task Force (IETF) that uses the domain name system (DNS) to map telephone numbers to Web addresses or uniform resource locators (URL). The goal of the ENUM standard is to provide a single number to replace the multiple numbers and addresses for an individual's home phone, business phone, fax, cell phone, and e-mail.

However, while IP technology has enabled the Peer To Peer operating model, there is no scalable mechanism to implement the Calling Party Pays business model with a Peer To Peer operating model. With the Peer To Peer operating model, the Calling Party Pays business model can only be implemented if every RSP (peer) has a bilateral commercial interconnect agreement with every other RSP (peer). Bilateral agreements among RSPs is not practical because the number of commercial peering agreements for all RSPs increases by the square of the number of RSPs (peers) [n*(n−1)/2 where n=number of peers], making large scale peer to peer networks using the Calling Party Pays business model virtually impossible.

Referring now to FIG. 1a, this figure illustrates a VoIP call within a RSP's network. Circle 100 in FIG. 1a represents the RSP network. The RSP network could be a private IP network or a subset of public Internet. The call control point 110 controls calls between the calling and receiving parties by providing calling party authentication, additional service features such as call forwarding, call signaling to the receiving party and generating called detail records to account for the call transaction. One of ordinary skill in the art who is familiar with VoIP technology will recognize that the Call Control Point could be either an H.323 gatekeeper, H.323 IP to IP gateway, SIP proxy, SIP back to back user agent, softswitch, session border controller or any other device which controls routing or signaling between source and destination VoIP devices. Two end user subscribers of the RSP Network are represented by a first telephone 120 with number 14045266060 and second telephone 130 with number 14045724600.

FIG. 1a represents a call scenario where the calling party 120 calls a receiving party 130. The call from the calling party 120 is initiated with a call setup message 400, such as a SIP Invite message to the Call Control Point 110. The Call Control Point determines if, and how, the call should be routed to the receiving party 130. To complete the call to the receiving party 130, the Call Control Point 110, sends a message 410 to the receiving party 130 to complete the call between the calling and called parties. When the RSP provides service to both the calling and called parties, the call can be completed within the RSP's network 100 without the use of facilities provided by another VoIP service provider. In FIG. 1a, inter-IP network peering does not occur.

Referring now to FIG. 1b, this Figure illustrates a VoIP call that requires inter-IP network peering. FIG. 1b includes the Source RSP Network 100, and with elements 110, 120 and 130 that are similar those described in FIG. 1a. Destination RSP Network 200 with Call Control Point 210 is introduced in FIG. 1b. Two end user subscribers of the Destination RSP Network 200 are represented by a third telephone 220 with number 17033089726 and fourth telephone 230 with number 17036054283. The calling party 120 places a call to telephone number 17036054283. The call starts with a call setup message 400 from the calling party 120 to the Call Control Point 110 of the Source RSP Network 100. The Source RSP Network 100 cannot complete the call within its network, since the receiving party 230 is served by the Destination RSP Network 200. Therefore, the source Call Control Point 110, sends a message 420 to the Call Control Point 210 of the Destination RSP Network 200. The destination Call Control Point 210 then sends a message to the receiving party 230 to complete the call.

Completion of the call scenario in FIG. 1b requires peering between the Source RSP 100 and Destination RSP 200 networks. Peering between VoIP networks requires two functions. First, the source IP network 100 must know which destination VoIP network 200 can complete the call. This information is referred to as routing—the source network 100 must know to which IP address the VoIP call should be routed. Routing information can be pre-programmed into the Call Control Point of the source network based on a pre-arranged, bilateral peering agreement between source and destination networks, or discovered in real time using mechanisms such as DUNDi or ENUM referred to previously.

The second function required for peering is access permission. The source network 100 must be permitted to access the destination network 200 to complete the call. Access permission between two IP networks is commonly controlled by the use of an access list at the destination network. The destination network 200 will only accept IP communications from IP addresses in its access control list. Other access control techniques are based on the inclusion of a password or digital signature in the call setup message 420 between the source and destination networks. If the destination network 200 can validate that the password or digital signature can only be from a trusted source, the call or peering transaction can be accepted without the source IP address being included in an access control list.

There are several limitations with this conventional technology used for VoIP interconnection or peering. First, the technique of bilateral peering agreements' is difficult to implement when a large number of bilateral peering agreements must be maintained. Real time route discovery techniques such as ENUM or DUNDi provide scalable solutions for inter-peer routing but do not provide scalable mechanisms for inter-peer access control or accounting. Accordingly, there is a need in the art for a scalable technique for inter-peer access control and accounting that is independent of the route discovery mechanism. A further need exists for a reliable scalable mechanism for implementing the Calling Party Pays business model with a Peer to Peer operating model.

A need exists in the art to solve this scalability problem for the Calling Party Pays business model in a Peer To Peer operating model. A need also exists in the art for eliminating or substantially reducing the number of bilateral agreements among RSPs.

SUMMARY OF THE INVENTION

According to one exemplary aspect of the technology, RSPs using VoIP may establish a single bilateral commercial agreement with a trusted third party or clearinghouse that can authorize interconnection, on a call by call basis, among source and destination RSPs. These source and destination RSPs will typically not have bilateral commercial interconnect agreements. The invention can comprise a trusted settlement clearinghouse that ensures interconnect data such as calling number, caller ID, interconnect rates and other critical data are valid and then executes any resulting financial transactions between the source and destination RSPs.

Exemplary aspects of the invention will refer to interconnections among RSPs providing VoIP telephony services. However, one of ordinary skill in the art will recognize that this invention can be used for peering access control and accounting between IP networks on a session by session basis for many applications in addition to VoIP, such as video sessions, data transfers with a guaranteed quality of service, bandwidth reservation, conferencing of three or more telephony or video sessions, content brokering, short message services, gaming and instant messaging.

A settlement clearinghouse, according to one exemplary aspect of the invention, can be referred to more generally as a Peering Authority, and may be used for peering access control and accounting of other IP applications in addition to VoIP. A settlement clearinghouse or peering authority can comprise a common trusted third party for all peers. The settlement clearinghouse can exchange digital certificates with each peer and use asymmetric key cryptography to establish and manage a trusted, bilateral relationship with each peer. These trusted bilateral relationships between each peer and the settlement clearinghouse can enable the settlement clearinghouse to securely authorize VoIP interconnection access control between anonymous peers on a call by call basis. In addition, the settlement clearinghouse can also securely collect accounting information for each call interconnected between VoIP networks. This accounting information may then be used for the tracking or billing of interconnected VoIP calls and execution of inter-network financial settlements.

According to another exemplary aspect of the invention, a source IP network may specify routing and all terms of an individual peering session with the destination network of its choice. According to other exemplary aspects of the technology, the inventive system and method describes how a trusted third party clearinghouse, or peering authority, can provide a centralized and scalable for solution for authorizing and accounting for inter-network peering sessions among known and anonymous peers. Exemplary aspects of the inventive system also include the discrete elements that form each of the individual peering authorization request messages, peering authorization response messages, and the peering authorization tokens. The discrete elements of the messages and authorization tokens are described in further detail below.

According to a further exemplary aspect, the inventive system comprises a technique that can decouple IP peering access control and accounting from routing. The inventive system illustrates how a source IP peer can submit a peering request to a trusted Peering Authority for access authorization to a known destination peer. Unlike conventional routing requests that are used by source networks to find the route to a destination, the peering request can comprise routing and all commercial terms (price, type of service, quality of service) for the proposed peering session. The role of the Peering Authority is to authorize and account for the peering transaction between the source and destination peers which have no trusted or commercial relationship.

DETAILED DESCRIPTION OF EXEMPLARY EMBODIMENTS

Figure 1A:
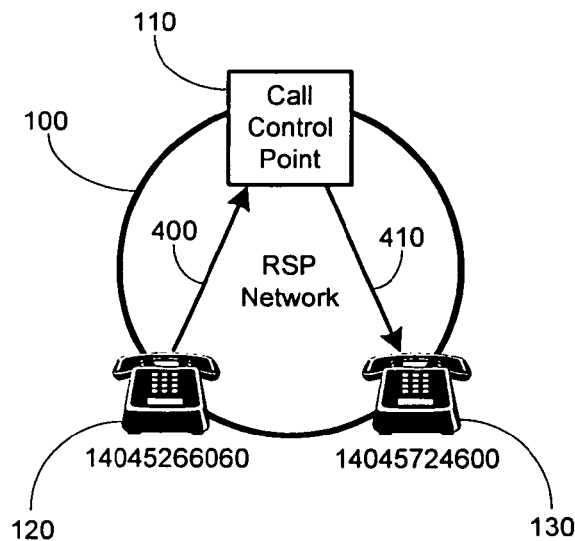
FIG. 1a is a functional block diagram that illustrates a conventional VoIP call within a RSP's network.

A settlement clearinghouse or peering authority can comprise a common trusted third party for all peers of VoIP networks. The settlement clearinghouse can exchange digital certificates with each peer and use asymmetric key cryptography to establish and manage a trusted, bilateral relationship with each peer. These trusted bilateral relationships between each peer and the settlement clearinghouse can enable the settlement clearinghouse to securely authorize VoIP interconnection access control between anonymous peers of VoIP networks on a call by call basis. In addition, the settlement clearinghouse can also securely collect accounting information for each call interconnected between VoIP networks. This accounting information may then be used for the tracking or billing of interconnected VoIP calls and execution of inter-network financial settlements.

Referring now to the drawings, in which like numerals represent like elements throughout the several Figures, aspects of the invention and the illustrative operating environment will be described.

Figure 2A:
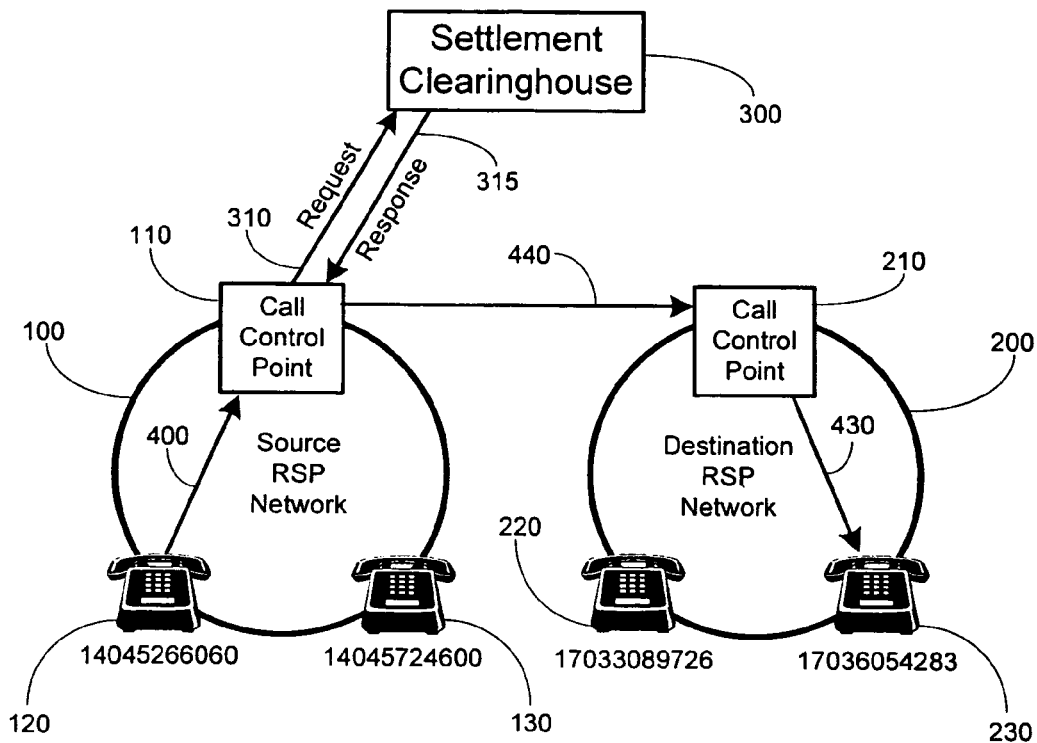
FIG. 2a is a functional block diagram illustrating an exemplary call scenario according to one exemplary embodiment of the invention.

An exemplary call scenario can begin with a calling party 120 who calls a telephone number 17036054283 as illustrated in FIG. 2a. The receiving party with this telephone number is denoted with reference numeral 230. A call setup message 400 is sent from the calling party 120 to the Call Control Point 110 of the Source RSP network. In this call scenario, the Call Control Point 110 of the source network 100 knows the IP address of the destination network 200 that can complete the call and the interconnect price the destination network 200 will charge to complete the call.

This interconnect routing and rate information may have been pre-configured based on a bilateral agreement between the source 100 and destination networks 200 or may have been discovered in real time using some other mechanism. However, before sending call setup message 440, the source Call Control Point 110 sends an interconnect authorization request message 310 to the Settlement Clearinghouse 300. One of ordinary skill in the art of IP communications recognizes that messages to and from the Settlement Clearinghouse 300 may be encrypted to ensure the message contents are secure.

The Clearinghouse 300 may operate in a networked environment using logical connections to one or more other remote computers. The Clearinghouse 300 and Call Control Points 110, 210 can comprise computers such as a personal computer, a server, a router, a network PC, a peer device, or a common network node. The logical connections depicted in FIG. 2a can include additional local area networks (LANs) and a wide area networks (WANs) not shown. Such networking environments are commonplace in offices, large industrial facilities, enterprise wide computer networks, intranets, and the Internet. While conventional telephones 120, 130, 220, and 230 are illustrated in each of the Figures, one of ordinary skill in the art recognizes that these telephones can comprise electronic devices that support VoIP. For example, the telephones 120, 130, 220, and 230 can comprise a general purpose computer connected to respective networks 100, 200.

Figure 1B:
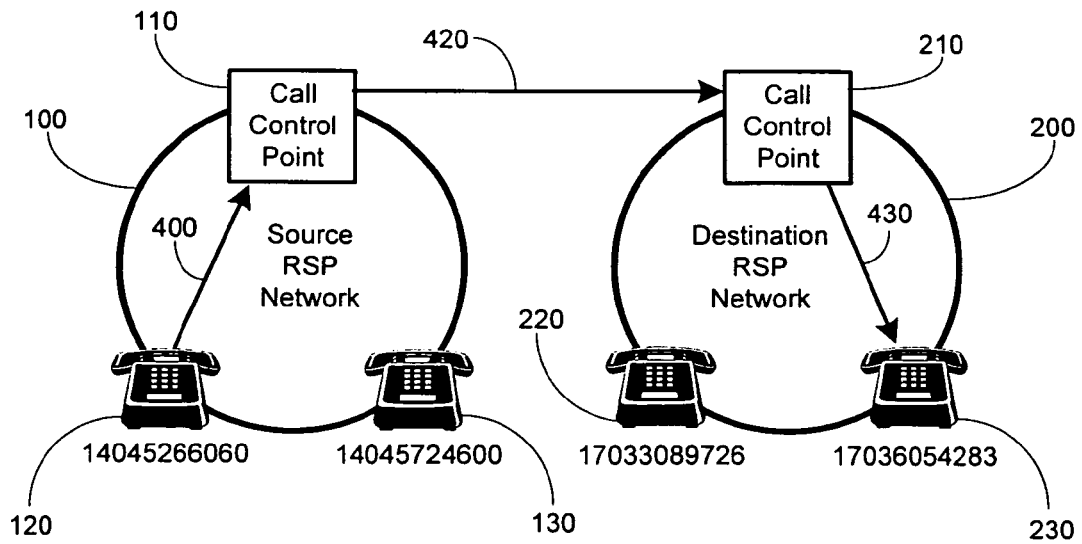
FIG. 1b is a functional block diagram illustrating a conventional VoIP call that requires inter-IP network peering.

The Clearinghouse 300 and Call Control Points 110, 210 illustrated in FIG. 1 may be coupled to a LAN through a network interface or adaptor. When used in a WAN network environment, the computers may typically include a modem or other means for establishing direct communication lines over the WAN. In a networked environment, program modules may be stored in remote memory storage devices. It will be appreciated that the network connections shown are exemplary and other means of establishing a communications link between computers other than depicted may be used.

Moreover, those skilled in the art will appreciate that the present invention may be implemented in other computer system configurations, including other hand-held devices besides hand-held computers, multiprocessor systems, microprocessor based or programmable consumer electronics, networked personal computers, minicomputers, mainframe computers, and the like.

The invention may be practiced in a distributed computing environment as illustrated in FIG. 2a, where tasks may be performed by remote processing devices that are linked through a communications network such as the distributed computer networks 25, 100, 200. In a distributed computing environment, program modules may be located in both local and remote storage devices.

The illustrated telephones 120, 130, 220, and 230 can comprise any general purpose computer capable of running software applications. The telephones 120, 130, 220, and 230 can be portable for mobile applications and they may be coupled to the respective networks 100, 200 though wired or wireless links. Typical wireless links include a radio frequency type in which the telephones 120, 130, 220, and 230 can communicate to the respective networks 100, 200 using radio frequency (RF) electromagnetic waves. Other wireless links that are not beyond the scope of the invention can include, but are not limited to, magnetic, optical, acoustic, and other similar wireless types of links.

Referring again to FIG. 2a, the interconnect authorization request message 310 can also be referred to more generally as a peering authorization request and may be used for other IP applications in addition to VoIP. The authorization request message 310 may include name and identification information about the source and destination networks, the calling and called parties and the interconnect rate for the call between the two networks.

To implement the Calling Party Pays business model, a positive interconnect rate indicates that the Source RSP Network 100 will pay the Destination RSP Network 200 to complete the call to the receiving party. The Settlement Clearinghouse 300, acting as the trusted third party between the Source RSP Network 100 and the Destination RSP Network 200 will approve or reject the interconnect authorization request message 310, based on the interconnect policies enforced by the Settlement Clearinghouse 300.

The Settlement Clearinghouse 300 responds to an interconnect authorization request message 310 by sending an authorization response message 315 back to the source Call Control Point 110 indicating that the authorization request was approved or rejected. The interconnect authorization response message 315 may also be referred to more generally as the peering authorization response and may be used for other IP applications in addition to VoIP. If the interconnect authorization request message 310 is approved by the Settlement Clearinghouse 300, the interconnect authorization response message 315 will comprise an interconnect authorization token that is returned to the Source RSP Network 100. The interconnect authorization token will also be referred to more generally as the peering authorization token and may be used for other applications in addition to VoIP.

The Settlement Clearinghouse 300 will typically sign the interconnect authorization token with its digital signature to ensure non-repudiation of the authorization token and to guarantee that the Settlement Clearinghouse 300 is party to the interconnection or peering transaction between the Source RSP Network 100 and the Destination RSP Network 200.

Another valuable service which may be provided by the Settlement Clearinghouse 300 is authentication and verification of the name and identification of either, or both, of the calling party 120 and the Source RSP Network 100. This function is especially useful for the Destination RSP Network 200 and receiving party 230 when a call is received from an unknown source network or anonymous peer. If the name and identification of either, or both, of the calling party 120 and source network 100 have been verified by the Settlement Clearinghouse 300 and are included in the signed authorization token conveyed in the interconnect call setup message 440, the destination network 200 and receiving party 230 may have some assurance that the name and identification information is legitimate.

When the source Call Control Point 110 receives interconnect authorization approval in the response 315 from the Settlement Clearinghouse 300, it can extract the interconnect authorization token from the response 315 and insert the authorization token in the call setup message 440 to the Call Control Point 210 of the Destination RSP Network 200. The destination Call Control Point 210 reviews the interconnect authorization token contained in the call setup message 440 to determine if it is valid.

Determining if the interconnect authorization token valid can be accomplished by the Call Control Point 210 validating the digital signature of the signed authorization token. If the interconnect authorization token has been signed by a trusted third party, such as by the Settlement Clearinghouse 300 who may have a bilateral commercial interconnect agreement with Call Control Point 210, then the token is valid and the call will be accepted, even if the call originates from an unknown IP address or anonymous peer. The token is deemed valid because of the relationship between the Settlement Clearinghouse 300 and Call Control Point 210.

To implement the Calling Party Pays business model, the signed authorization token in the call setup message 440 will include the interconnect rate required by the Destination RSP Network 200. The signed token with the interconnect rate, provides the Destination RSP Network 200 with a document that cannot be repudiated or rejected by the Settlement Clearinghouse 300. The interconnect authorization token contained in the setup message 440 is evidence that the Settlement Clearinghouse approved the interconnection between the source and destination networks at the specified rate.

Figure 2B:
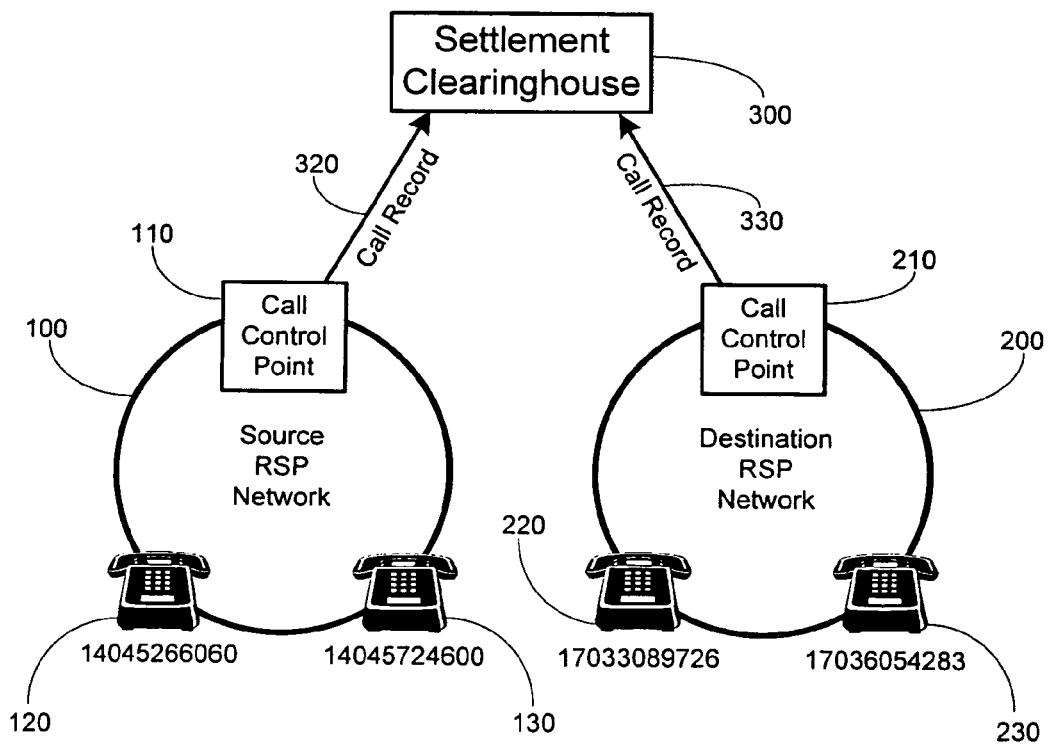
FIG. 2b is a functional block diagram illustrating how call detail records are collected by a settlement clearinghouse for interconnect accounting and settlement billing according to one exemplary embodiment of the invention.

FIG. 2b illustrates how call detail records are collected by the Settlement Clearinghouse 300 for interconnect settlement billing. When the call between the calling party 120 and receiving party 230 ends, the source Call Control Point 110 sends a call detail record 320 to the Settlement Clearinghouse 300 and the destination Call Control Point 210 also sends a call detail record 330 to the Settlement Clearinghouse 300. The call detail records 320 and 330 may include the interconnect rate approved by the Settlement Clearinghouse 300 in the interconnect authorization token.

One of ordinary skill in the art of IP communications will recognize that the technique described above for inter-IP network access control and accounting for VoIP applications can also be applied generally for many other IP applications that require the use or facilities of multiple networks. For example, exchanging video programs over the IP network using the described inter-IP network access control is not beyond the scope of the invention.

Exemplary Process for Securely Authorizing VoIP Interconnections Between Anonymous Peers The processes and operations of the inventive system described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

Referring now to FIG. 3, the logical flow charts of FIGS. 3a, 3b, 3c and 3d illustrate the process of how a clearinghouse, or peering authority, is used to authorize and track accounting information for a VoIP call/communication exchanged between two IP networks. The inter-network call scenario starts in FIG. 3a in Step 002 when the calling party, an end user on the source network 100, initiates a call to a receiving party on an external network 200. In Step 002, a call setup message 400 (as illustrated in FIG. 2a) is created and is sent to the call control point 110 of the source network 100. Call control point 110 in Step 004 then determines that the call cannot be completed on the local network and must be routed to the external network serving the receiving party 230. Interconnecting with an external network will require permission to access the external network. This is the stage in the process where a peering authority or clearinghouse can play a role.

Step 006 can comprise two sub-steps: In the first sub-step, the source network 100 usually must determine which external network(s) serve(s) the receiving party 230 (sometimes through using route discovery) and determine the terms of interconnecting with the external network (peering criteria). There are many established ways the source network 100 can determine the how the call can be routed to the destination network 200 serving the receiving party 230.

Routes to the external called number of the receiving party 230 could be pre-programmed in the routing table of the call control point 110 of the source network 100 based on negotiated interconnect agreements with destination networks 230. Alternatively, the routes can be discovered in real time using protocols such as ENUM or DUNDi. Once the call control point 110 of the source network 100 has determined the possible routes to the receiving party 230, the second sub-step of Step 006 is for the call control point 110 of the source network 100 to determine additional peering criteria such as bandwidth, network quality of service, and the price the calling party 120 must pay the destination network 200 to complete the call.

The peering criteria information can be based on interconnect agreements negotiated with destination networks 200 or advertising. In the future, the peering criteria may be obtained from IP protocols that advertise peering prices and service levels over the network. When the route and peering criteria are determined, this information is then sent in Step 008 as a peering authorization request 310 to the Clearinghouse 300 as illustrated in FIG. 2a.

After the Clearinghouse 300 receives the peering authorization request from the call control point 110 of the source network 100, in Step 010 the Clearinghouse 300 authenticates the source of the information and the calling party. Specifically, in step 012, the Clearinghouse 300 authenticates the source device (call control point 110) which sent the peering request. Step 012 can be completed in various ways such as checking the IP address of the source device or more securely using Secure Sockets Layer (SSL) client authentication. If the source device cannot be authenticated, the peering request may be denied in Step 014. Identifying the source device will reveal the operator of the source network that has established a trusted relationship with the Clearinghouse.

Next, in step 016, the Clearinghouse 300 checks the status of the source network operator to determine if it may originate calls or be granted access to another network. If access to another network is not allowed, the peering request may be denied in Step 018. As part of this process, the Clearinghouse 300 may determine details about the source network identification, such as the organization name and address. One important element in the source network identification is information which indicates how the source network identification was verified.

This information about the source network 100 that is verified by the Clearinghouse 300 can be a value added service for the receiving party 200. In Step 020, the Clearinghouse 300 may check the status of the calling party to determine if it may access external networks. The Clearinghouse 300 may also take actions to identify the calling party. Step 020 can be similar to a Caller Name (CNAM) look-up in the traditional Public Switched Telephone Network (PSTN) or some other mechanism which more securely identifies and verifies the calling party identification. If the calling party is not allowed to access networks external to the source network, the peering request may be denied in Step 022.

Figure 3A:
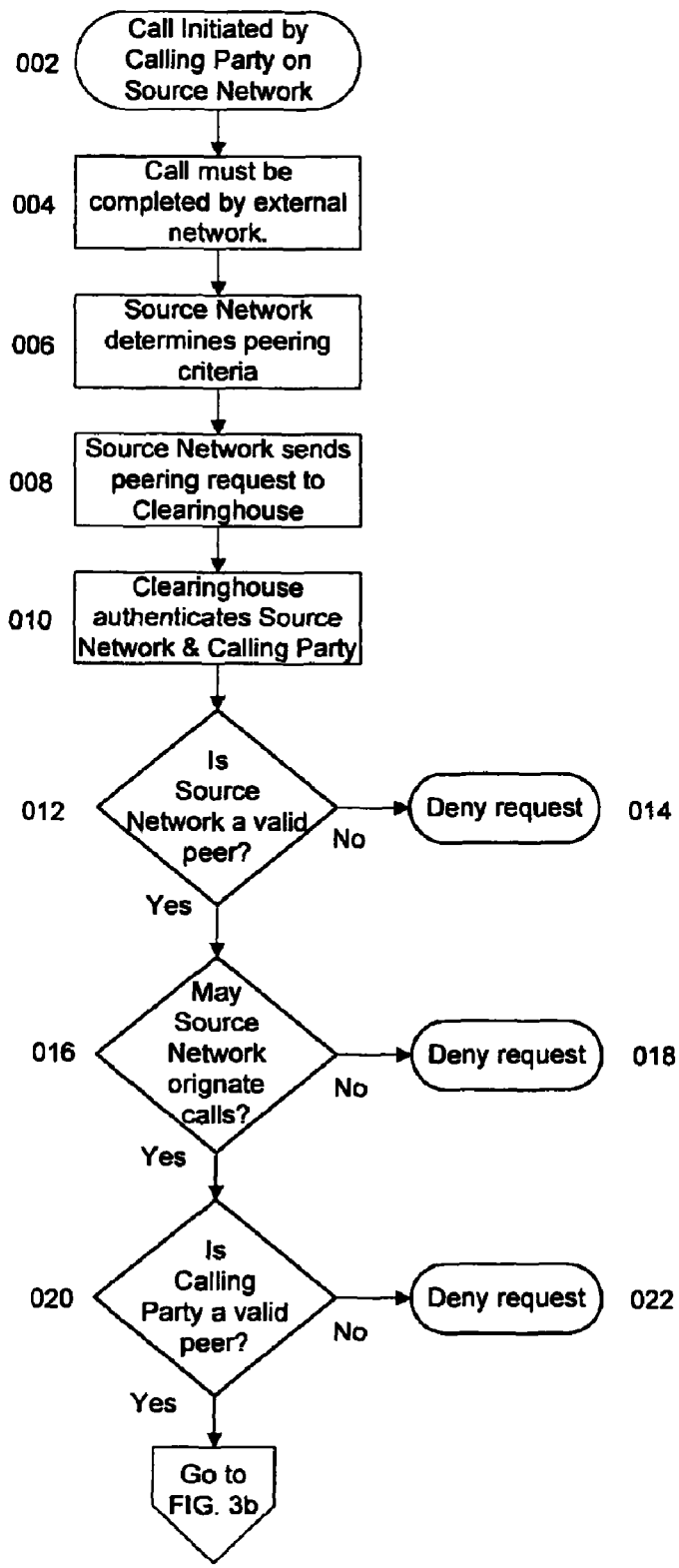
FIGS. 3a-3d are logic flow diagrams illustrating a process of how a clearinghouse or peering authority authorizes and tracks accounting information for a VoIP call interconnected between two IP networks according to one exemplary embodiment of the invention.
Figure 3B:
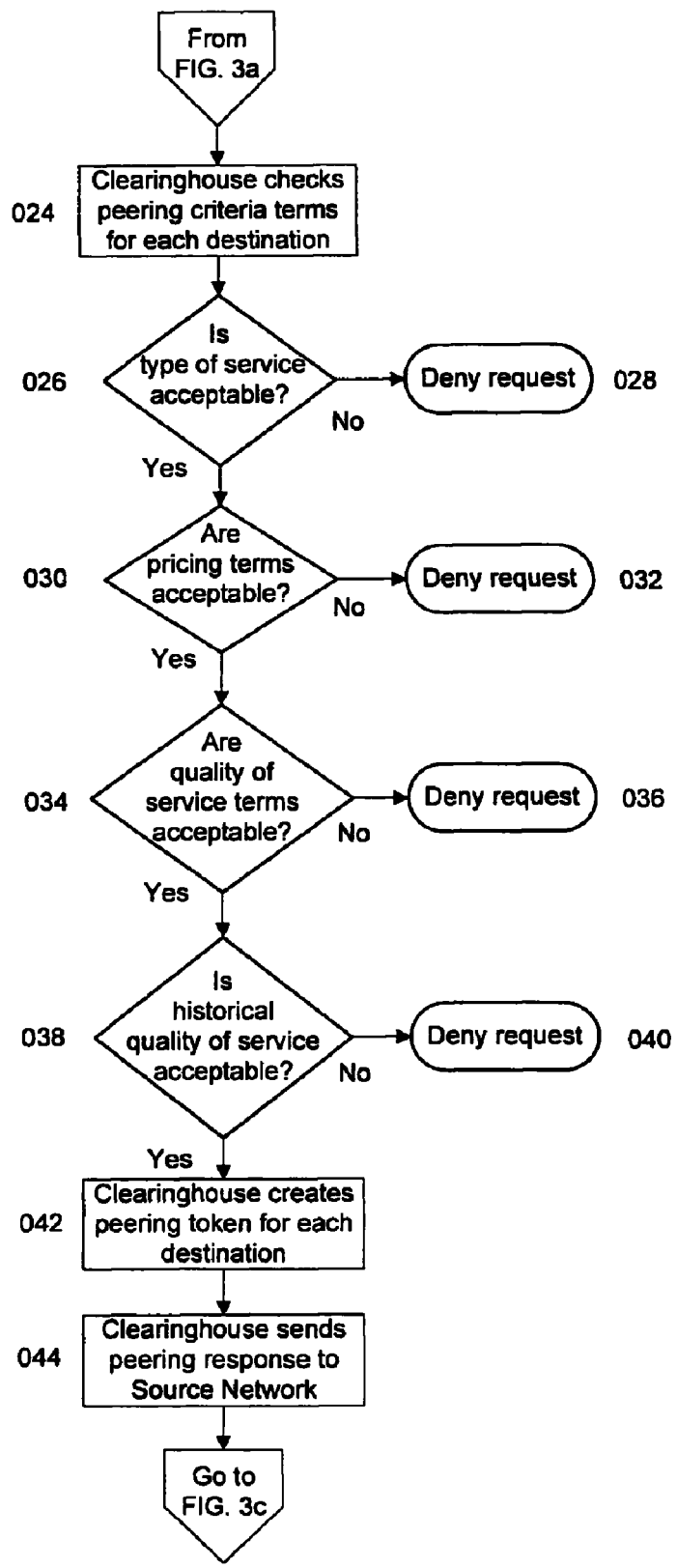

Referring now to FIG. 3b, after the peering request has been fully authenticated, the next step for the Clearinghouse 300 is to examine the peering criteria in the peering request for correctness in Step 024. Peering requests that are illogical, impossible or which cannot be billed for may be denied. Specifically, in Step 026, the Clearinghouse 300 can determine if the type of service requested is possible. For example, if the peering request specifies a video session and the destination peer does not support video, then the peering request will be denied in Step 028.

Next, in Step 030, the Clearinghouse 300 can check the pricing terms of the peering request. The pricing terms of the peering request can be compared to pricing tables stored in the Clearinghouse 300. If the pricing terms of the request do not match any entries of the table(s), or if the pricing terms are incomplete or ambiguous, the peering request may be denied in Step 032. For example, if the currency specified is Japanese Yen (JPY) and the clearinghouse only performs settlement in US Dollars (USD) then the peering request would be denied in Step 032.

In Step 034, the Clearinghouse 300 checks if the quality of service (QoS) terms of the peering request. The Clearinghouse 300 can check the QoS terms of the peering request against stored values in tables that the Clearinghouse may have for the destination networks 200. If the service level is not supported, then the peering request will be denied by the Clearinghouse in Step 036. For example, if a peering request specifies 64 kb/sec bandwidth for a VoIP call and the Clearinghouse 300 recognizes that 64 kb/sec bandwidth cannot be provided by the destination network 200, then the peering request will be denied in Step 036.

In Step 038, the Clearinghouse 300 compares historical quality of service of the destination device or network 200 to the quality of service requested in the peering request. If the historical quality of service is less than the requested quality of service, the peering request may be denied in Step 040. For example, if the Answer Seizure Ratio specified in the peering request is 50%, but Clearinghouse historical records indicate that the destination device or network 200 has a historical Answer Seizure Ratio of 40% then the peering request would be denied in Step 040.

If all authentication and peering criteria checks are successful, the Clearinghouse 300 creates a peering authorization token for each destination network 200 in Step 042. The token is usually digitally signed using a private key of the Clearinghouse 300 to ensure data integrity and non-repudiation of the token. The tokens are then returned to the call control point 110 of source network 100 in a peering authorization response 315 in Step 044.

Figure 3C:
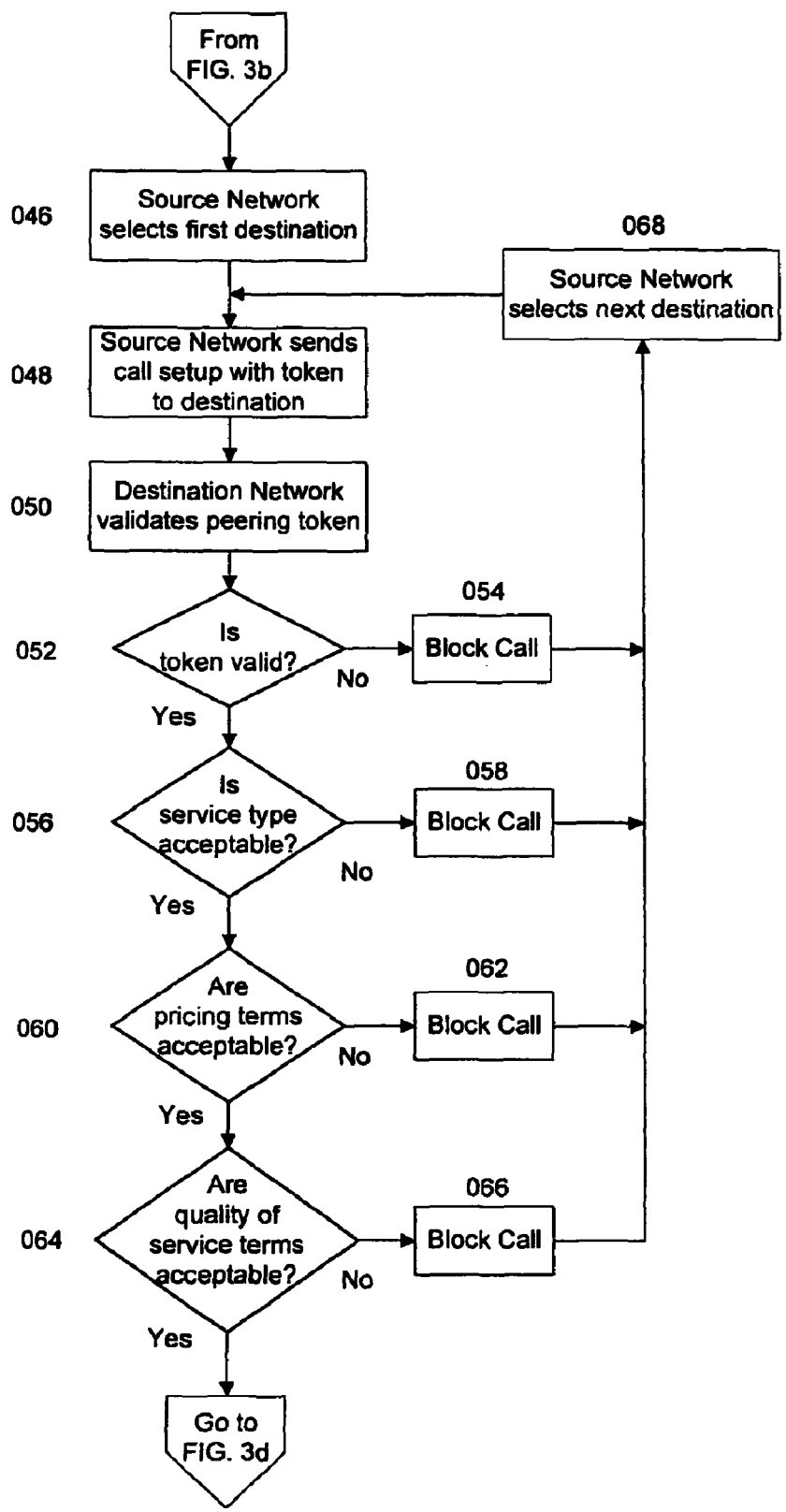

Referring now to FIG. 3c, when the call control point 110 of source network 100 receives the peering authorization response 315 from the Clearinghouse 300, in Step 046, the call control point 110 can select the first destination network 200 to complete the call. In step 048, the call control point 110 forms the call setup message 440 so that it comprises the peering authorization token.

When the destination network 200 receives the call setup message, in Step 050 the call control point 210 will validate the peering token contained in the setup message before accepting the call. A common practice for securely validating tokens is validating the digital signature of the token using the public key of the clearinghouse 300. In Step 052, the token can be validated using the public key. If the digital signature is valid; then the destination network 200 can be certain that the token was signed using the Clearinghouse private key. If the token is not valid, the call control point 210 of the destination network 200 will block the call in Step 054. The process then continues in Step 068 in which the call control point 110 of the source network selects the next available destination network 200. If the inquiry to decision Step 052 is positive, then the process proceeds to decision Step 056.

If the token is valid, the call control point 210 of the destination network 200 may choose to check the peering criteria present in the token. The peering criteria can comprise service type, pricing terms, quality of service, just to name a few. Other peering criteria is not beyond the scope of the invention. In decision Step 056, the call control point 210 can determine if the service type present in the token is acceptable for its network configuration. If the inquiry to decision Step 056 is negative, then the call is blocked in Step 058. The process then continues in Step 068 in which the call control point 110 of the source network selects the next available destination network 200. If the inquiry to decision Step 056 is positive, then the process proceeds to decision Step 060.

In decision Step 060, the call control point 210 can determine if the pricing terms found in the token are acceptable for its network terms. If the inquiry to decision Step 060 is negative, then the call is blocked in Step 062. The process then continues in Step 068 in which the call control point 110 of the source network selects the next available destination network 200. If the inquiry to decision Step 060 is positive, then the process proceeds to decision Step 064.

In decision Step 064, the call control point 210 can determine if the quality of service terms found in the token are acceptable for its quality of service parameters. If the inquiry to decision Step 064 is negative, then the call is blocked in Step 066. The process then continues in Step 068 in which the call control point 110 of the source network selects the next available destination network 200.

Figure 3D:
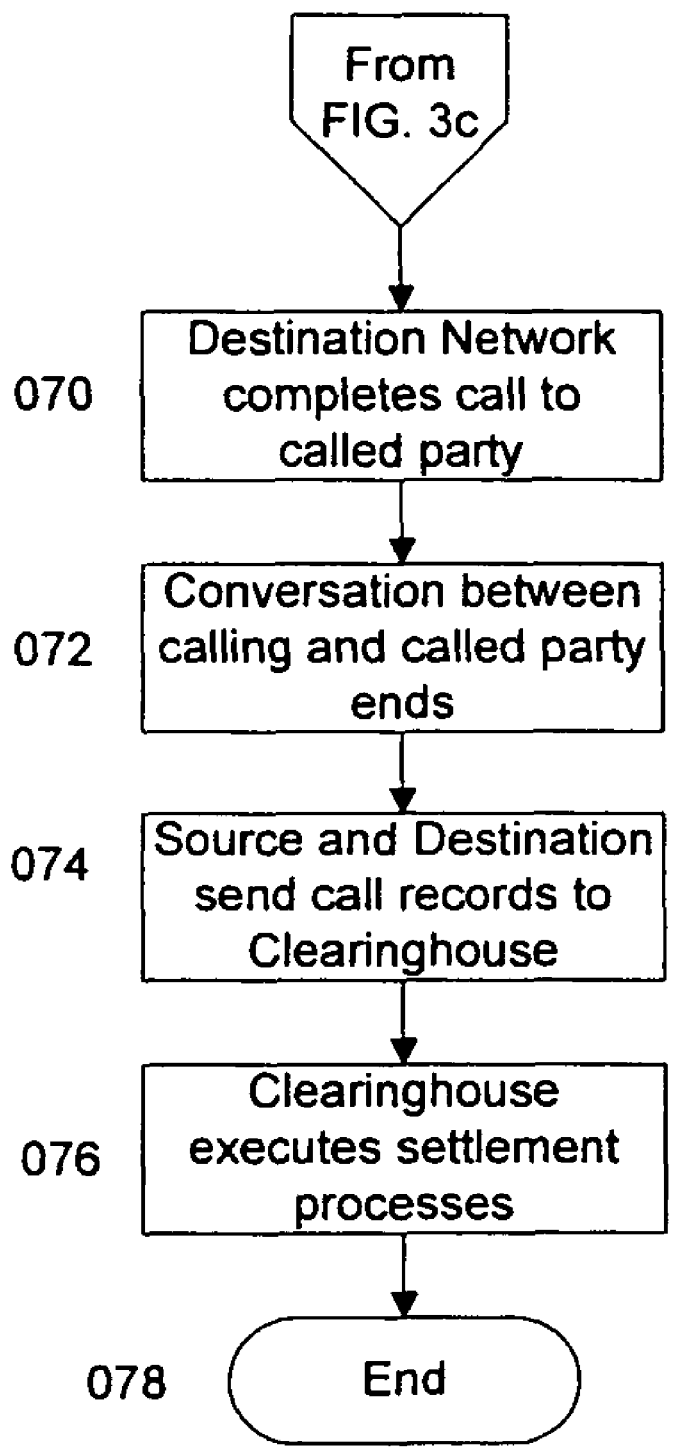

Referring now to FIG. 3d, if the peering token validation process conducted by the call control point 210 of the destination network 200 passes, the destination network completes the call to the receiving party 230 (as illustrated in FIG. 2a) in Step 070. When the conversation ends and the calling and receiving parties 120, 230 hang-up in Step 072, both the source and destination networks 100, 200 send call records 320, 330 to the Clearinghouse 300 in Step 074. The Clearinghouse 300 uses the call record information to execute settlement procedures in Step 076. For example, the Clearinghouse 300 may perform various services on behalf of the peers (networks 100, 200) such as analyzing and reporting inter-peer traffic flows, billing for peering sessions, or execution of any cash settlement among peers related to peering sessions 076.

Peering Authorization Request 310

The Peering Authorization Request 310 from the source IP network 100 to the Peering Authority (Clearinghouse 300) may include the following information listed in Table 1 below.

TABLE 1

Peering Authorization Request Information

| Information Element | Description |
|---|---|
| Date and time stamp | Date/Time of the peering authorization request. |
| Call Identifier | Unique identifier for the call |
| GroupId | Same as ConferenceID in H.323. Calls with unique CallIds can share a common GroupID. i.e a conference call. |
| Calling Party | Unique identifier for the calling party, i.e.: ITU E.164 telephone number, sip uri, tel uri, IP address and port, name resolved by DNS to an IP address. |
| Calling Party Identification | A set of information (Calling Party Name, Calling Party Authority and Calling Party Verification) which identifies the calling party. |
| Calling Party Name | Name or text description of the calling party. For calling parties from the PSTN, this value would typically be name from a Line Interface Database (LIDB) or Calling Name (CNAM) database that corresponds to the calling party's telephone number. |
| Calling Party Organization | Organization of the calling party. |
| Calling Party First Name | First name of calling party. |
| Calling Party Last Name | Last name of calling party. |
| Calling Party Street Name | Street address of calling party. |
| Calling Party Street Number | Street number of calling party. |
| Calling Party Address2 | Additional address information, such as apartment or suite of calling party. |
| Calling Party Postal Code | Postal code of calling party. |
| Calling Party City | City of calling party. |
| Calling Party State | State of calling party. |
| Calling Party Country | Country of calling party. |
| Calling Party Id Number | Unique number identifying the calling party. |
| Calling Party Website | Website of calling party. |
| Calling Party URI | Uniform Resource Identifier of calling party. |
| Calling Party Authority | Name or text description of the authority that authenticated and verified the calling party identification for the peering authorization request. |
| Calling Party Verification | Integer value which indicates the level of verification of the calling party identification. 00 - No verification |

TABLE 1-continued

Peering Authorization Request Information

| Information Element | Description |
|---|---|
| | 01 - Based on the calling party's telephone number |
| | 02 - Based on source device IP address |
| | 03 - Combination of 01 and 02 |
| | 04 - Based on password of calling party |
| | 05 - Combination of 01 and 04 |
| | 07 - Combination of 01, 02 and 04 |
| | 08 - Based on the SSL/TLS client authentication of the calling party. If the Verification technique is unknown, then the Verification value should be empty. |
| Source Network | IP address and port (optional) or name resolved by Domain Name Server (DNS) to an IP address. |
| Source Network Identification | A set of information (Source Network Name, Source Network Authority and Source Network Verification) which identifies the operator of the source network. |
| Source Network Name | Name or text description of the source network operator. |
| Source Network Organization | Organization of the Source Network. |
| Source Network Street Name | Street address of Source Network. |
| Source Network Street Number | Street number of Source Network. |
| Source Network Address2 | Additional address information, such as apartment or suite of Source Network. |
| Source Network Postal Code | Postal code of Source Network. |
| Source Network City | City of Source Network. |
| Source Network State | State of Source Network. |
| Source Network Country | Country of Source Network. |
| Source Network Id Number | Unique number identifying the Source Network. |
| Source Network Website | Website of Source Network. |
| Source Network URI | Uniform Resource Identifier of Source Network. |
| Source Network Authority | Name or text description of the authority that authenticated and verified the source network identification for the peering authorization request. |
| Source Network Verification | Integer value which indicates the level of verification of the source network identification. |
| | 00 - No verification |
| | 01 - Based on the calling party's telephone number |
| | 02 - Based on source device IP address |
| | 03 - Combination of 01 and 02 |
| | 04 - Based on password of calling party |
| | 05 - Combination of 01 and 04 |
| | 07 - Combination of 01, 02 and 04 |
| | 08 - Based on the SSL/TLS client authentication of the calling party. If the Verification technique is unknown, then the Verification value should be empty. |
| Source device | IP address and port (optional) or name resolved by DNS. |
| Source trunk group | String value with trunk group. This value may or may not include circuit ID. |
| Receiving party | Unique identifier for the receiving party, i.e.: ITU E.164 telephone number, sip uri, tel uri, IP address and port, name resolved by Domain Name Server (DNS) to an IP address. |
| Application | Application requested by the source network and served by the destination network. This includes any application provided as a service such as a gaming or video streaming from a specific web camera. |
| File | File requested by the source network and served by the destination network. This includes data files, ring tones, audio files or video files. |
| Destination device | IP address and port (optional) or name resolved by DNS. |
| Destination trunk group | String value with trunk group. This value may or may not include circuit ID. |
| Currency - Pricing Indication | Currency of billing rate, i.e USD. |
| Setup - Pricing Indication | Amount of currency - Fixed billing rate per call or transaction. |
| Amount - Pricing Indication | Amount of currency - Billing rate per increment. |
| Increment - Pricing Indication | Number of units in each billing increment. |
| Unit - Pricing Indication | Seconds, packets, bytes, pages, calls. |
| Type of service requested | voice, video, bandwidth reservation, conference. |
| SubscriberInfo | Data string which identifies calling party or subscriber, i.e. username and PIN. |
| CustomerId | Customer ID, identifies the Peering Authority customer or operator who controls the source network. |
| DeviceId | Identifies the source device. |
| Data Rate | Data rate requested for VoIP call or IP session. |
| Number of Channels | Number of channels requested for IP session. |
| Bandwidth | Amount of bandwidth reserved for IP session. |
| Codec | Compression/decompression algorithm requested. |
| Quality of Service | Level of service quality requested. |
| Quality of Service Class | Class of service quality requested. |
| Answer Seizure Ratio (ASR) | Minimum acceptable ASR. If the historical ASR for calls to a destination device is less than the ASR in the peering request, the call should not be authorized. |
| Mean Hold Time (MHT) | Minimum acceptable MHT. If the historical MHT for calls to a destination device is less than the MHT in the peering request, the call should not be authorized. |
| Post Dial Delay (PDD) | Minimum acceptable PDD. If the historical PDD of calls to a destination device is less than the PDD in the peering request, the call should not be authorized. |
| Delay | Minimum acceptable average one-way packet delay for transmissions sent or received by a destination device. If the Peering Authority has historical delay statistics for destination device that are greater than the delay value in the peering request, the call should not be authorized. |
| Jitter | Minimum acceptable variance of packet delay (transit time from source to destination) for transmissions sent or received by a destination device. If the Peering Authority has historical jitter statistics for the destination device that are greater than the jitter value in the peering request, the call should not be authorized. |
| PackLoss | Number of packets lost/total packets for transmissions sent or received by a destination device. If the Peering Authority has historical PackLoss data for the destination device that are greater than the PackLoss value in the peering request, the call should not be authorized. |

Peering Authorization Request 310—XML Mapping

Table 2 below maps peering authorization request message information elements to eXtensible Markup Language (XML) tags.

TABLE 2

| Peering Authorization Request - XML TAGS | |
| --- | --- |
| Information Element | XML tag |
| Date and time stamp | \<Timestamp\> |
| Call Identifier | \<CallId encoding="base64"\> CallId may or may not be encoded. |
| Calling party | \<SourceInfo type="e164"\> <br> \<SourceInfo type="sip"\> <br> \<SourceInfo type="h323"\> <br> \<SourceInfo type="url"\> <br> \<SourceInfo type="email"\> <br> \<SourceInfo type="transport"\> <br> \<SourceInfo type="international"\> <br> \<SourceInfo type="national"\> <br> \<SourceInfo type="network"\> <br> \<SourceInfo type="subscriber"\> <br> \<SourceInfo type="abreviated"\> <br> \<SourceInfo type="e164prefix"\> <br> \<SourceInfo type="tel"\> <br> \<SourceInfo type="enum"\> <br> "transport" value must be an IP address or name resolved by DNS. <br> type="tel" is a phone number in tel uri format. <br> type="enum" is a phone number in ENUM format. |
| Calling Party Identification | \<CallingPartyId\> XML tag indicating that sub-tags \<Name\>, \<Organization\>, \<FirstName\>, \<LastName\>, \<StreetName\>, \<StreetNumber\>, \<Address2\>, \<PostalCode\>, \<City\>, \<State\>, \<Country\>, \<IdNumber\>, \<Website\>, \<uri\>, \<Authority\> and \<Verification\> correspond to the Calling party. |
| Name | \<Name\> |
| Organization | \<Organization\> |
| First Name | \<FirstName\> |
| Last Name | \<LastName\> |
| Street Name | \<StreetName\> |
| Street Number | \<StreetNumber\> |
| Address2 | \<Address2\> |
| Postal Code | \<PostalCode\> |
| City | \<City\> |
| State | \<State\> |
| Country | \<Country\> |
| Id Number | \<IdNumber\> |
| Website | \<Website\> |
| Uniform Resource Ind. | \<uri\> |
| Authority | \<Authority\> |
| Verification | \<Verification\> |
| Source Network | \<SourceAlternate type="sip"\> <br> \<SourceAlternate type="url"\> <br> \<SourceAlternate type="transport"\> <br> \<SourceAlternate type="international"\> <br> \<SourceAlternate type="national"\> <br> \<SourceAlternate type="network"\> <br> \<SourceAlternate type="abreviated"\> <br> \<SourceAlternate type="e164prefix"\> <br> "transport" value must be an IP address or name resolved by DNS |
| Source Network Identification | \<SourceNetworkId\> XML tag indicating that sub-tags \<Name\>, \<Organization\>, StreetName\>, \<StreetNumber\>, \<Address2\>, \<PostalCode\>, \<City\>, \<State\>, \<Country\>, \<IdNumber\>, \<Website\>, \<uri\>, \<Authority\> and \<Verification\> correspond to the source network or the network operator of the Calling party. |
| Source device | \<DeviceInfo type="e164"\> <br> \<DeviceInfo type="sip"\> <br> \<DeviceInfo type="h323"\> <br> \<DeviceInfo type="url"\> <br> \<DeviceInfo type="email"\> <br> \<DeviceInfo type="transport"\> <br> \<DeviceInfo type="international"\> <br> \<DeviceInfo type="national"\> <br> \<DeviceInfo type="network"\> <br> \<DeviceInfo type="abreviated"\> <br> \<DeviceInfo type="e164prefix"\> |

TABLE 2-continued

Peering Authorization Request - XML TAGS

| Information Element | XML tag |
|---|---|
| | <DeviceInfo type="tel"> |
| | <DeviceInfo type="enum"> |
| | "transport" value must be an IP address or name resolved by DNS. |
| | "tel" value is a tel uri. |
| Source trunk group | <SourceAlternate type="network"> |
| | String value with trunk group. This value may or may not include circuit ID. |
| Receiving party | <DestinationInfo type="e164"> |
| | <DestinationInfo type="sip"> |
| | <DestinationInfo type="h323"> |
| | <DestinationInfo type="url"> |
| | <DestinationInfo type="email"> |
| | <DestinationInfo type="transport"> |
| | <DestinationInfo type="international"> |
| | <DestinationInfo type="national"> |
| | <DestinationInfo type="network"> |
| | <DestinationInfo type="subscriber"> |
| | <DestinationInfo type="abreviated"> |
| | <DestinationInfo type="e164prefix"> |
| | <DestinationInfo type="tel"> |
| | <DestinationInfo type="enum"> |
| | "transport" value must be an IP address or name resolved by DNS. |
| | "tel" value is a tel uri. |
| Application | <Application> |
| File | <File> |
| Destination network | <DestinationAlternate type="e164"> |
| | <DestinationAlternate type="sip"> |
| | <DestinationAlternate type="h323"> |
| | <DestinationAlternate type="url"> |
| | <DestinationAlternate type="email"> |
| | <DestinationAlternate type="transport"> |
| | <DestinationAlternate type="international"> |
| | <DestinationAlternate type="national"> |
| | <DestinationAlternate type="subscriber"> |
| | <DestinationAlternate type="abreviated"> |
| | <DestinationAlternate type="e164prefix"> |
| | <DestinationAlternate type="tel"> |
| | <DestinationAlternate type="enum"> |
| | "transport" value must be an IP address or name resolved by DNS. |
| | "tel" value is a tel uri. |
| Destination trunk group | <DestinationAlternate type="network"> |
| | String value with trunk group. This value may or may not include circuit ID. |
| Amount - Usage Detail | <Amount> (within <UsageDetail> tags) |
| Increment - Usage Detail | <Increment> (within <UsageDetail> tags) |
| Unit - Usage Detail | <Unit> (within <UsageDetail> tags) |
| Currency - Pricing Indication | <Currency> (within <PricingIndication> tags) |
| Setup - Pricing Indication | <Setup> (within <PricingIndication> tags) |
| Amount - Pricing Indication | <Amount> (within <PricingIndication> tags) |
| Increment - Pricing Indication | <Increment> (within <PricingIndication> tags) |
| Unit - Pricing Indication | <Unit> (within <PricingIndication> tags) |
| Type of service requested | <Service> |
| SubscriberInfo | <SourceAlternate type="subscriber"> |
| CustomerId | <CustomerId> |
| DeviceId | <DeviceId> |
| Data Rate | <DataRate> |
| Number of Channels | <NumberOfChannels> |
| Bandwidth | <Bandwidth> |
| Codec | <Codec> |
| Quality of Service | <QualityOfService> |
| Quality of Service Class | <QoSClass> |
| Answer Seizure Ratio (ASR) | <AnswerSeizureRatio> (within <QualityOfService> tags) |
| Mean Hold Time (MHT) | <MeanHoldTime> (within <QualityofService> tags) |
| Post Dial Delay (PDD) | <PostDialDelay> (within <QualityOfService> tags) |
| OSP Version | <OSPVersion> |
| Call Identifier | <CallId> |

TABLE 2-continued

Peering Authorization Request - XML TAGS

| Information Element | XML tag |
|---|---|
| Delay | <Delay> |
| Jitter | <Jitter> |
| Packet Loss | <PackLoss> |

Peering Authorization Response 315

The Peering Authorization Response 315 from the Peering Authority (Clearinghouse 300) to the Source IP Network 100 may include the following information listed in Table 3 below:

TABLE 3

Peering Authorization Response Information

| Information Element | Note |
|---|---|
| Date and time of response | Date/Time of authorization response. |
| Call Identifier | Any unique identifier for the call or session. |
| Group Id | Same as ConferenceID in H.323. Calls with unique CallIds can share a common GroupID. i.e a conference call. |
| Calling party | Unique identifier for the calling party, i.e.: E.164 number, sip uri, IP address, name resolved by Domain Name Server (DNS) to an IP address. |
| Source network | IP address or name which can be resolved using DNS |
| Source device | IP address or name which can be resolved using DNS. |
| Source trunk group | String value with trunk group. This value may or may not include circuit ID. |
| Receiving party | Unique identifier for the receiving party, i.e.: E.164 number, sip uri, IP address, name resolved by DNS to an IP address. |
| Application | Application requested by the source network and served by the destination network. This includes any application provided as a service such as a gaming or video streaming from a specific web camera. |
| File | File requested by the source network and served by the destination network. This includes data files, ring tones, audio files or video files. |
| Destination signaling address | IP address or name which can be resolved using DNS. |
| Destination trunk group | String value with trunk group. This value may or may not include circuit ID. |
| Destination Protocol | h323-Q931, h323-LRQ, SIP, IAX |
| OSP version | Most recent version of OSP protocol supported by the destination 0.0.0, 1.4.3, 2.1.1, 4.1.1 |
| Authorization Token | Described in the next section. |

Peering Authorization Token

For non-repudiation of peering authorization and settlement services, the peering authorization token usually must be digitally signed with the private key of the Peering Authority (Clearinghouse 300). The peering authorization token may be encoded, encrypted or plain text. The token defines what type of service, quantity of service, quality of service and pricing has been authorized by the Peering Authority.

The peering authorization token returned from a Peering Authority (Clearinghouse 300) may include the information elements in Table 4 below.

TABLE 4

Peering Authorization Token Information

| Information Element | Description |
|---|---|
| Version | Version of the token. |
| Random number | Any randomly generated number. |
| Transaction ID generated by the settlement server | A unique number identified for the call or peering session. |
| Contact ID | Identifies the Peering Authority. |
| Valid after time | Call or session must be established after this time. |
| Valid until time | Call or session must be established before this time. |
| Calling Party | Unique identifier for the calling party, i.e.: E.164 number, sip uri, IP address, name resolved by Domain Name Server (DNS) to an IP address. |
| Calling Party Identification | A set of information (Calling Party Name, Calling Party Authority and Calling Party Verification) which identifies the calling party. |
| Calling Party Name | Name or text description of the calling party. For calling parties from the PSTN, this value would typically be name from a Line Interface Database (LIDB) or Calling Name (CNAM) database that corresponds to the calling party's telephone number. |
| Calling Party Organization | Organization of the calling party. |
| Calling Party First Name | First name of calling party. |
| Calling Party Last Name | Last name of calling party. |
| Calling Party Street Name | Street address of calling party. |
| Calling Party Street Number | Street number of calling party. |
| Calling Party Address2 | Additional address information, such as apartment or suite of calling party. |
| Calling Party Postal Code | Postal code of calling party. |
| Calling Party City | City of calling party. |
| Calling Party State | State of calling party. |
| Calling Party Country | Country of calling party. |
| Calling Party Id Number | Unique number identifying the calling party. |
| Calling Party Website | Website of calling party. |
| Calling Party URI | Uniform Resource Identifier of calling party. |
| Calling Party Authority | Name or text description of the authority that authenticated and verified the calling party identification for the peering authorization request. |
| Calling Party Verification | Integer value which indicates the level of verification of the calling party identification. 00 - No verification 01 - Based on the calling party's telephone number 02 - Based on source device IP address 03 - Combination of 01 and 02 04 - Based on password of calling party 05 - Combination of 01 and 04 07 - Combination of 01, 02 and 04 08 - Based on the SSL/TLS |

TABLE 4-continued

Peering Authorization Token Information

| Information Element | Description |
|---|---|
| | client authentication of the calling party. |
| Source Network Identification | A set of information (Source Network Name, Source Network Authority and Source Network Verification) which identifies the operator of the source network. |
| Source Network Name | Name or text description of the source network operator. |
| Source Network Organization | Organization of the Source Network. |
| Source Network Street Name | Street address of Source Network. |
| Source Network Street Number | Street number of Source Network. |
| Source Network Address2 | Additional address information, such as apartment or suite of Source Network. |
| Source Network Postal Code | Postal code of Source Network. |
| Source Network City | City of Source Network. |
| Source Network State | State of Source Network. |
| Source Network Country | Country of Source Network. |
| Source Network Id Number | Unique number identifying the Source Network. |
| Source Network Website | Website of Source Network. |
| Source Network URI | Uniform Resource Identifier of Source Network. |
| Source Network Authority | Name or text description of the authority that authenticated and verified the source network identification for the peering authorization request. |
| Source Network Verification | Integer value which indicates the level of verification of the source network identification. 00 - No verification 01 - Based on the calling party's telephone number 02 - Based on source device IP address 03 - Combination of 01 and 02 04 - Based on password of calling party 05 - Combination of 01 and 04 07 - Combination of 01, 02 and 04 08 - Based on the SSL/TLS client authentication of the calling party. If the Verification technique is unknown, then the Verification value should be empty. |
| Receiving party | Unique identifier for the receiving party, i.e.: E.164 number, sip uri, IP address, name resolved by Domain Name Server (DNS) to an IP address. |
| Application | Application requested by the source network and served by the destination network. This includes any application provided as a service such as a gaming or video streaming from a specific web camera. |
| File | File requested by the source network and served by the destination network. This includes data files, ring tones, audio files or video files. |
| Amount - Usage Detail | Amount of usage authorized |
| Increment - Usage Detail | Number of units per increment |
| Units - Usage Detail | Seconds, packets, bytes, pages, calls |
| Currency - Pricing Indication | Currency of transaction, i.e. USD |
| Setup - Pricing Indication | Fixed price per call |
| Amount - Pricing Indication | Price per increment |
| Increment - Pricing Indication | Units per increment |
| Units - Pricing Indication | Seconds, packets, bytes, pages, calls |
| Type of service | Service requested - voice, video, data. Default is voice. |
| Destination address | Used for look ahead routing |
| Destination trunk group | Used for look ahead routing |
| Destination protocol | Used for look ahead routing |
| OSP Version | Used for look ahead routing |
| Call Identifier | Unique identifier for the call |
| Group ID (i.e for conference call admission) | Same as ConferenceID in H.323. Calls with unique CallIds can share a common GroupID. i.e aconference call. |
| Data Rate | Data rate requested for the call or peering session |
| Number of Channels | Number of channels requested |
| Bandwidth | Amount of bandwidth reserved |
| Codec | Compression/decompression algorithm |
| Quality of Service | Level of service quality requested |
| Quality of Service Class | Class of service quality requested |
| Answer Seizure Ratio (ASR) | <ASR> (within <QualityOfService> tags) |
| Mean Hold Time (MHT) | <MHT> (within <QualityOfService> tags) |
| Post Dial Delay (PDD) | <PDD> (within <QualityOfService> tags) |

Peering Authorization Token—XML Mapping

Table 5 below maps peering authorization token information elements to eXtensible Markup Language (XML) tags and ASCII tags.

TABLE 5

Peering Authorization Token - XML Tags

| Information Element | XML Tag | ASCII Tag |
|---|---|---|
| Version | <Version> | V |
| Random Number | <TokenInfo random='30113'> | r |
| Transaction ID | <TransactionId> | I |
| ContactID | <ContactId> | x |
| Valid After Time | <ValidAfter> | a |
| Valid Until Time | <ValidUntil> | u |
| Calling Number | <SourceInfo> | c |
| Calling Party Name | <Name> within <CallingPartyId> tags | J |
| Calling Party Organization | <Organization> within <CallingPartyId> tags | ! |
| Calling Party First Name | <FirstName> within <CallingPartyId> tags | $ |
| Calling Party Last Name | <LastName> within <CallingPartyId> tags | } |
| Calling Party Street Name | <StreetName> within <CallingPartyId> tags | ` |
| Calling Party Street Number | <StreetNumber> within <CallingPartyId> tags | / |
| Calling Party Address2 | <Address2> within <CallingPartyId> tags | \ |
| Calling Party Postal Code | <PostalCode> within <CallingPartyId> tags | ) |

TABLE 5-continued

Peering Authorization Token - XML Tags

| Information Element | XML Tag | ASCII Tag |
|---|---|---|
| Calling Party City | <City> within <CallingPartyId> tags | % |
| Calling Party State | <State> within <CallingPartyId> tags | ? |
| Calling Party Country | <Country> within <CallingPartyId> tags | & |
| Calling Party Id Number | <IdNumber> within <CallingPartyId> tags | ] |
| Calling Party Authority | <Authority> within <CallingPartyId> tags | j |
| Calling Party Verification | <Verification> within <CallingPartyId> tags | k |
| Source Network Name | <Name> within <SourceNetworkId> tags | S |
| Source Network Organization | <Organization> within <SourceNetworkId> tags | < |
| Source Network Street Name | <StreetName> within <SourceNetworkId> tags | ; |
| Source Network Street Number | <StreetNumber> within <SourceNetworkId> tags | — |
| Source Network Address2 | <Address2> within <SourceNetworkId> tags | = |
| Source Network Postal Code | <PostalCode> within <SourceNetworkId> tags | . |
| Source Network City | <City> within <SourceNetworkId> tags | ( |
| Source Network State | <State> within <SourceNetworkId> tags | > |
| Source Network Country | <Country> within <SourceNetworkId> tags | ^ |
| Source Network Id Number | <IdNumber> within <SourceNetworkId> tags | [ |
| Source Network Authority | <Authority> within <SourceNetworkId> tags | A |
| Source Network Verification | <Verification> | P |
| Called Number | <DestinationInfo> | C |
| Application | <Application> | g |
| File | <File> | F |
| Amount - Usage Detail | <Amount> (within <UsageDetail> tags) | M |
| Increment - Usage Detail | <Increment> (within <UsageDetail> tags) | n |
| Units - Usage Detail | <Units> (within <UsageDetail> tags) | U |
| Currency - Pricing Indication | <Currency> (within <PricingIndication> tags) | y |
| Setup - Pricing Indication | <Setup> (within <PricingIndication> tags) | p |
| Amount - Pricing Indication | <Amount> (within <PricingIndication> tags) | m |
| Increment - Pricing Indication | <Increment> (within <PricingIndication> tags) | N |
| Units - Pricing Indication | <Units> (within <PricingIndication> tags) | f |
| Type of service | <Service> | s |
| Destination address for look ahead routing | <DestinationAlternate type='transport'> | d |
| Destination trunk group for look ahead routing | <DestinationAlternate type='network'> | e |
| Destination protocol for look ahead routing | <DestinationProtocol> | D |
| OSP Version for look ahead routing | <OSPVersion> | o |
| Call Identifier | <CallId encoding='base64'> CallId may or may not be encoded | i |
| Look Ahead Tag | <LookAhead> | K |
| Group ID | <GroupId> | G |
| Data Rate | <DataRate> | R |
| Number of Channels | <NumberOfChannels> | b |
| Bandwidth | <Bandwidth> | B |
| Codec | <Codec> | E |
| Quality of Service | <QualityOfService> | Q |
| Quality of Service Class | <QoSClass> | q |

Accounting

After a VoIP call, or a peering session, is completed it must be accounted. The call or peering session details must be reported to the settlement clearing or peering authority (Clearinghouse 300). Table 5 below lists Information Elements which should be included in a call or session detail record. The XML format is provided for information elements which have not been defined previously in this document.

TABLE 5

Call or Session Record Information

| Information Element | Note |
|---|---|
| Time Stamp | Time/Date of the Message |
| Role | Source, Destination, Other |
| Transaction ID | Same as Peering Authorization Response |

TABLE 5-continued

Call or Session Record Information

| Information Element | Note |
| --- | --- |
| Call ID | Same as Peering Authorization Response |
| Source Network | Same as Peering Authorization Response |
| Source Device | Same as Peering Authorization Response |
| Source Trunk Group | Same as Peering Authorization Response |
| Calling Number | Same as Peering Authorization Response |
| Subscriber information | Same as Peering Authorization Response |
| Called Number | Same as Peering Authorization Response |
| Application | Same as Peering Authorization Response |
| File | Same as Peering Authorization Response |
| Destination Network | Same as Peering Authorization Response |
| Destination Trunk Group | Same as Peering Authorization Response |
| Amount - Usage Indication | Amount of usage (call duration) |
| Increment - Usage Indication | Number of units per increment |
| Units - Usage Indication | Seconds, packets, bytes, pages, calls |
| Currency - Pricing Indication | Currency of transaction, i.e. USD |
| Amount - Pricing Indication | Price per increment |
| Increment - Pricing Indication | Units per increment |
| Units - Pricing Indication | Seconds, packets, bytes, pages, calls |
| Call Start Time | The time when the calling party starts the call, i.e. after last digit is dialed or when the send button is pushed. <StartTime> |
| Call Alerting Time | When the called telephone begins ringing <AlertTime> |
| Call Connect Time | When the calling and receiving party connect <ConnectTime> |
| Call End Time | When the call ends <EndTime> |
| Post Dial Delay | Time elapsed between Call Alert time and Call Start Time. <PostDialDelay> within <UsageDetail> tags |
| Statistics | As defined in ETSI TS 101 321 V4.1.1 |
| Customer Id | Same as Peering Authorization Response |
| Device ID | Same as Peering Authorization Response |
| GroupID | Same as Peering Authorization Response |
| Data Rate | Data rate requested for VoIP call or IP session. |
| Number of Channels | Number of channels requested for IP session. |
| Bandwidth | Amount of bandwidth reserved for IP session. |
| Codec | Compression/decompression algorithm requested. |
| Quality of Service | Level of service quality requested. |
| Quality of Service Class | Class of service quality requested. |
| Termination Cause Code | Reason why the call was disconnected. <TCCode> |
| Source of Release Complete | IP address of device which terminated the VoIP call or IP session <ReleaseSource> |

Figure 4A:
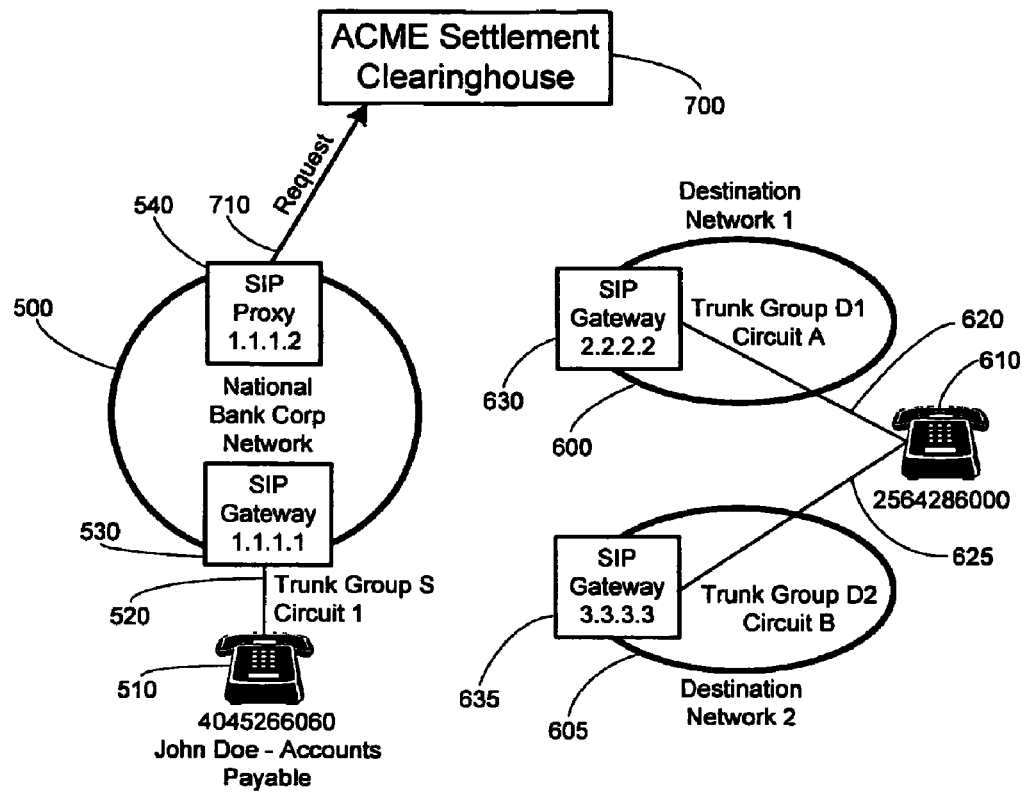
FIG. 4a is a functional block diagram illustrating an inter-IP network peering scenario that includes a peering authorization request according to an exemplary embodiment of the invention.

Referring now to FIG. 4a, this Figure illustrates an inter-IP network peering scenario which illustrates peering authorization request and response messages and the peering authorization token. The example call scenario in FIG. 4a illustrates a call from an end user on the National Bank Corp Network 500 to a receiving party 610 with telephone number 2564286000 served by an external network 600. This call scenario requires interconnection, or peering, between the National Bank Corp Network 500 and a destination network 600.

The call begins with the calling party 510, John Doe in the Accounts Payable department of National Bank Corp. The calling party has a traditional circuit switched telephone with telephone number 4045266060. The telephone is connected via Circuit 1 of Trunk Group S 520 to a SIP gateway 530 having an IP address 1.1.1.1. SIP, or Session Initiation Protocol, is an IP protocol used transmitting voice, video and other communications over IP networks as is known to one of ordinary skill in the art. The SIP gateway 530 is registered with the SIP Proxy 540 with IP address 1.1.1.2. The SIP Proxy 540 performs the roll of the Call Control Point 110 that is illustrated in FIG. 2a.

When the calling party 510 calls the telephone number 2564286000, a call setup message is sent from SIP Gateway 530 to the SIP Proxy 540. The SIP Proxy determines to call either Destination Network 1 600 or Destination Network 2 605. Table 7 below summarizes the routing data and peering criteria for completing the call from the SIP Proxy 540 to a destination network which can complete the call to the receiving party 610.

TABLE 7

Summary of Routing Data and Peering Criteria for Completing Peering Criteria

| Possible Destinations | Network 1 | Network 2 |
| --- | --- | --- |
| IP Address | 2.2.2.2 | 3.3.3.3 |
| Trunk Group and Circuit ID | D1:A | D2:B |
| Peering Rate | 0.10 | 10 |
| Billing Increment | 60 | 60 |
| Billing Units | seconds | seconds |
| Currency | USD | JPY |
| Bandwidth required in kb/second | 64 | 64 |
| Minimum acceptable Answer Seizure Ratio | 0.5 | 0.5 |
| Minimum acceptable Mean Hold Time | 120 | 120 |
| Minimum acceptable Post Dial Delay | 2 | 2 |

Table 7 above includes routing information, such as the IP addresses of SIP Gateways 630 and 635 and trunk group—circuit details 620 and 625 connecting to the receiving party telephone 610. Table 7 also includes peering rate information which can be used to bill for the peering session. The peering rate for 64 kbs of bandwidth to terminate a voice call on Network 1—600 is $0.10 USD per 60 seconds. For Network 2—605 the peering rate for the same service is 10 JPY per 60 seconds. Table 7 also includes minimum acceptable quality of service in terms of Answer Seizure Ratio, Mean Hold Time and Post Dial Delay.

Before sending a call setup to either Destination Network 1—600 or Destination Network 2—605, the SIP Proxy 540 sends a peering authorization request 710 to the Peering Authority, ACME Settlement Clearinghouse 700. Below is the peering authorization request message 710. It is an eXtensible Markup Language (XML) message transmitted via Hyper Text Transport Protocol (HTTP).

by including the criteria information within the request message, but outside of the <destination> tags.

When the ACME Settlement Clearinghouse 700 receives the peering authorization request 710, it may perform the following functions:

1. Authenticate the source network 500. Authentication of the source network 500 may be accomplished using various techniques such as authenticating the IP address of the source Call Control Point 540 or using Secure Sockets Layer/Transport Layer Security (SSL/TLS) client authentication.

```
POST /osp HTTP/1.1
Host: 172.16.4.78
content-type: text/plain
Content-Length: 745
Connection: Keep-Alive
<?xml version="1.0"?>
<Message messageId="127821" random="12782">
<AuthorizationRequest componentId="127820">
   <Timestamp>2004-12-06T21:58:03Z</Timestamp>
   <CallId encoding="base64">vIAeOEcIEdmUff2oaL5HDA==</CallId>
   <SourceInfo type="e164">4045266060</SourceInfo>
   <CallingPartyId>
      <Name>John Doe - Accounts Payable<Name>
      <Authority>National Bank Corp<Authority>
      <Verification>02<Verification>
   </CallingPartyId>
   <DeviceInfo type="transport">[1.1.1.1]</DeviceInfo>
   <SourceAlternate type="network">TrunkGrpS:1</SourceAlternate>
   <SourceAlternate type="transport">[1.1.1.2]</SourceAlternate>
   <DestinationInfo type="e164">2564286000</DestinationInfo>
   <Destination>
      <DestinationAlternate type="network">TrunkGrpD1:A</DestinationAlternate>
      <DestinationAlternate type="transport">[2.2.2.2]</DestinationAlternate>
      <PricingIndication>
         <Currency>USD</Currency>
         <Amount>0.10</Amount>
         <Increment>60</Increment>
         <Unit>s</Unit>
      </PricingIndication>
      <Bandwidth>64</Bandwidth>
      <QualityOfService>
         <AnswerSeizureRatio>0.5</AnswerSeizureRatio>
         <MeanHoldTime>120</MeanHoldTime>
         <PostDialDelay>2</PostDialDelay>
      </QualityOfService>
   </Destination>
   <Destination>
      <DestinationAlternate type="network">TrunkGrpD2:B</DestinationAlternate>
      <DestinationAlternate type="transport">[3.3.3.3]</DestinationAlternate>
      <PricingIndication>
         <Currency>JPY</Currency>
         <Amount>10</Amount>
         <Increment>60</Increment>
         <Unit>s</Unit>
      </PricingIndication>
      <Bandwidth>64</Bandwidth>
      <QualityOfService>
         <AnswerSeizureRatio>0.5</AnswerSeizureRatio>
         <MeanHoldTime>120</MeanHoldTime>
         <PostDialDelay>2</PostDialDelay>
      </QualityOfService>
   </Destination>
   <CustomerId critical="False">1000</CustomerId>
   <DeviceId critical="False">1000</DeviceId>
   <Service/>
</AuthorizationRequest>
</Message>
```

In the peering authorization request 710 above, separate pricing, bandwidth and quality of service criteria is specified for each destination within each set of <Destination> tags. A global set of peering critiera may be applied to all destinations 2. Determine if the operator of the source network 500 may originate a call to the receiving party 610. For example, the source network 500 may be denied authorization because the operator of the source network has insufficient credit with the Settlement Clearinghouse 700.

3. Determine if the calling party 510 or source device may originate a call to the receiving party 610. For example, the source device may be blocked from originating calls due to specific Settlement Clearinghouse 300 policies.
4. Determine if the destination networks 600 and 605 may terminate calls. For example, authorization of calls may be denied to destination network by the Settlement Clearinghouse 700 based on business policies.
5. Determine if the destination devices or Call Control Point 630 or 635 may terminate the call. For example, authorization of calls to a destination device may be denied if historical quality of service statistics (ASR, MHT, PDD, Delay, Jitter or PackLoss) for VoIP calls using the device are less than the minimum quality of service levels defined in the peering authorization request 710.
6. Determine if the Settlement Clearinghouse 700 can use the pricing information provided in the peering authorization request:
   a. Is Currency acceptable?
   b. Is Setup pricing acceptable?
   c. Is Amount acceptable?
   d. Is Billing Increment acceptable?
   e. Is Unit acceptable?
7. If the call is authorized to the one or more of the destination networks 600, 605, create a peering authorization token with a specified usage amount based on business policies or criteria such as:
   a. Credit balance of the Source Network 500 operator.
   b. Price of interconnect.
8. Create call detail record, at the ACME Settlement Clearinghouse 700, which documents the details of the peering authorization request including interconnect pricing information.
9. Send a peering authorization response message to the SIP Proxy 540 of the source network 500.

Figure 4B:
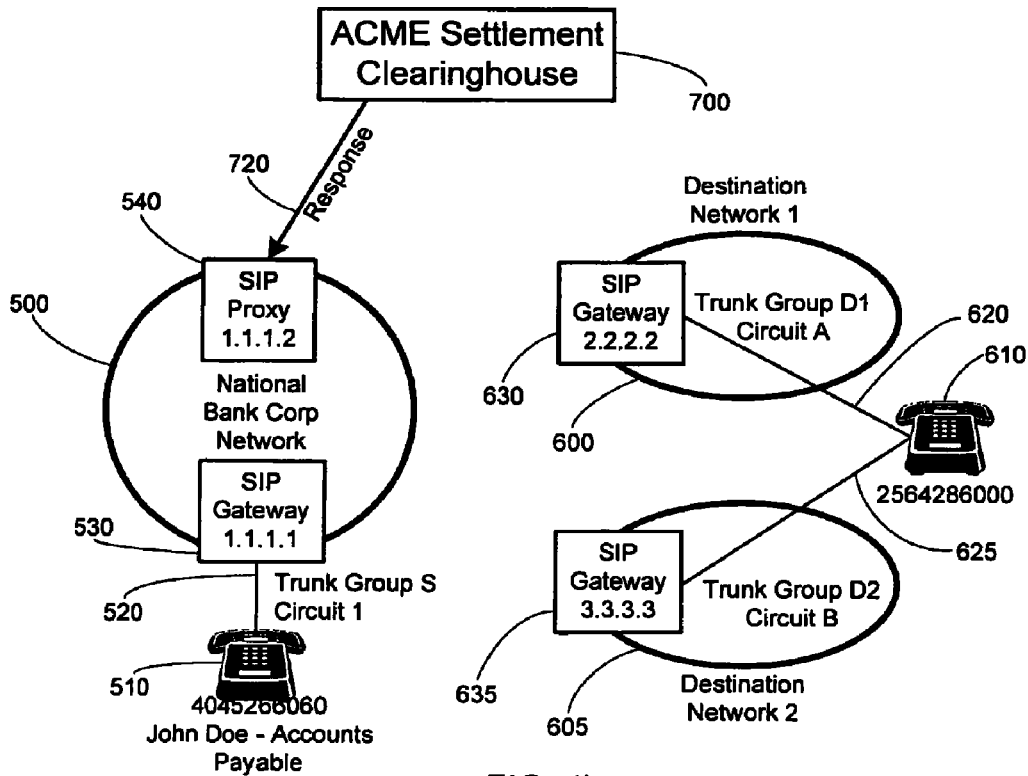
FIG. 4b is a functional block diagram illustrating an exemplary peering authorization response message according to one exemplary embodiment of the invention.

Below is the peering authorization response message 720 illustrated in FIG. 4b. This message sent from the ACME Settlement Clearinghouse 700 to the SIP Proxy 540 and authorizes the peering request to both Destination Network 1—600 and Destination Network 2—605 for 14400 seconds:

```
<?xml version='1.0'?>
<Message messageId='127821' random='12782'>
<AuthorizationResponse componentId='127820'>
<Timestamp>2004-12-06T21:58:03Z</Timestamp>
<Status>
   <Description>SUCCESS</Description>
   <Code>200</Code>
</Status>
<TransactionId>4733131489186097309</TransactionId>
<Destination>
   <CallId encoding='base64'>vIAeOEcIEdmUff2oaL5HDA==</CallId>
   <DestinationInfo type='e164'>2564286000</DestinationInfo>
   <DestinationSignalAddress>[2.2.2.2]</DestinationSignalAddress>
   <Token encoding='base64'>
lcnZlcjBcMA0GCSqGSIb3DQEBAQUAA0sAMEgCQQDxnhsFeNRCIV964IxAxS0V0IQxK+dDlE
D6vn+eVcEHdE0DbbNOgT9vflIjXUVt3NyER3WXCXQtQoOvDBPXIHqtIfAgMBAAEwDQYJKoZ
IhvcNAQEEBQADQQCbizVxrw9HaIYB5MawCrqpTS4xV7p4hOu+m7rv6qUJHU6eHFw911P1iu
bOAyMC+s46hE7c1C8IRgYRxEclzfudMYGjMIGgAgEBMDwwNzEhMB8GA1UEAxMYU3VuRTQ1M
C05LnRyYW5zbmV4dXMuY29tMRIwEAYDVQQKEwlPU1BTZXJ2ZXICAQEwDAYIKoZIhvcNAgUF
ADANBgkqhkiG9w0BAQEFAARAfNbeo5Y19qFSeITbJQO8Lq8y7DwKukhXY4FTEJFc0zUPq+a
z9rkaGrjzW6+0+3lQlAftXekTteP6RilVbfX6nw==
   </Token>
   <UsageDetail>
      <Amount>14400</Amount>
      <Increment>1</Increment>
      <Service/>
      <Unit>s</Unit>
   </UsageDetail>
   <ValidAfter>2004-12-06T21:53:03Z</ValidAfter>
   <ValidUntil>2004-12-06T22:03:03Z</ValidUntil>
   <DestinationProtocol critical='False'>IAX</DestinationProtocol>
   <OSPVersion critical='False'>1.4.3</OSPVersion>
   <SourceInfo type='e164' critical='False'>4045266060</SourceInfo>
   <DestinationAlternate type='network'critical='False'>TrunkGrpD1:A</DestinationAlternate>
</Destination>
<Destination>
   <CallId encoding='base64'>vIAeOEcIEdmUff2oaL5HDA==</CallId>
   <DestinationInfo type='e164'>2564286000</DestinationInfo>
   <DestinationSignalAddress>[3.3.3.3]</DestinationSignalAddress>
   <Token encoding='base64'>
lcnZlcjBcMA0GCSqGSIb3DQEBAQUAA0sAMEgCQQDxnhsFeNRCIV964IxAxS0V0IQxK+dDlE
D6vn+eVcEHdE0DbbNOgT9vflIjXUVt3NyER3WXCXQtQoOvDBPXIHqtIfAgMBAAEwDQYJKoZ
IhvcNAQEEBQADQQCbizVxrw9HaIYB5MawCrqpTS4xV7p4hOu+m7rv6qUJHU6eHFw911P1iu
bOAyMC+s46hE7c1C8IRgYRxEclzfudMYGjMIGgAgEBMDwwNzEhMB8GA1UEAxMYU3VuRTQ1M
C05LnRyYW5zbmV4dXMuY29tMRIwEAYDVQQKEwlPU1BTZXJ2ZXICAQEwDAYIKoZIhvcNAgUF
ADANBgkqhkiG9w0BAQEFAARAfNbeo5Y19qFSeITbJQO8Lq8y7DwKukhXY4FTEJFc0zUPq+a
z9rkaGrjzW6+0+3lQlAftXekTteP6RilVbfX6nw==
   </Token>
   <UsageDetail>
      <Amount>14400</Amount>
      <Increment>1</Increment>
      <Service/>
      <Unit>s</Unit>
```

-continued

```
  </UsageDetail>
  <ValidAfter>2004-12-06T21:53:03Z</ValidAfter>
  <ValidUntil>2004-12-06T22:03:03Z</ValidUntil>
  <DestinationProtocol critical='False'>SIP</DestinationProtocol>
  <OSPVersion critical='False'>2.1.1</OSPVersion>
  <SourceInfo type='e164' critical='False'>4045266060</SourceInfo>
  <DestinationAlternate type='network'critical='False'>TrunkGrpD2:B</DestinationAlternate>
 </Destination>
</AuthorizationResponse>
</Message>
```

At least one important information element in the peering authorization response message 720 is the peering authorization token. The source network Call Control Point 110 (see FIG. 2a), or the SIP Proxy 540 in FIG. 4b will include this token in its call setup to the destination network 600, 605 for access permission to complete the call. The token is base64 encoded in these examples and is not readable. However, below is a decoded version of the token for Destination Network 1—600. The token lists all of the peering criteria defined in the peering authorization request. Also, the token includes information about the source network identification. This information, combined with the calling party information, provides the receiving party with information about the calling party and the organization from which the call originated.

```
v=1
r=30113
c=4045266060
J=John Doe - Accounts Payable
j=National Bank Corp
k=02
S=National Bank Corp
A=ACME Settlement Clearinghouse
P=07
C=2564286000
i=NjMzMDYxMzgzMDMxMzA2MTMyMzAzMDAwMDA=
a=2004-12-02T20:52:30Z
u=2004-12-02T21:02:30Z
I=4733144047667937289
M=14400
n=1
s=
```

```
<?xml version='1.0'?>
<TokenInfo random='30113'>
<SourceInfo type='e164'>4045266060</SourceInfo>
<CallingParty>
   <Identification>John Doe - Accounts Payable<Identification>
   <Authority>National Bank Corp<Authority>
   <Verification>02<Verification>
</CallingParty>
<SourceNetwork>
   <Identification>National Bank Corp<Identification>
   <Authority>ACME Settlement Clearinghouse<Authority>
   <Verification>07<Verification>
</SourceNetwork>
<DestinationInfo type='e164'>2564286000</DestinationInfo>
<CallId encoding='base64'>NjMzMDYxMzgzMDMxMzA2MTMyMzAzMDAwMDA=</CallId>
<ValidAfter>2004-12-02T20:37:58Z</ValidAfter>
<ValidUntil>2004-12-02T20:47:58Z</ValidUntil>
<TransactionId>4733140074823188489</TransactionId>
<UsageDetail>
   <Amount>14400</Amount>
   <Increment>1</Increment>
   <Service/>
   <Unit>s</Unit>
</UsageDetail>
<PricingIndication>
   <Currency>USD</Currency>
   <Setup>0<Setup>
   <Amount>0.10</Amount>
   <Increment>60</Increment>
   <Unit>s</Unit>
</PricingIndication>
<Bandwidth>64</Bandwidth>
</TokenInfo>
```

Example of Peering Authorization Token in Text Format

Peering authorization tokens may be in any format, not just an XML format. Below is the peering authorization reformatted in American Standard Code for Information Interchange (ASCII) text format:

-continued

```
U=s
p=USD
e=0
p=0.1
N=60
```

```
   f=s
   B=64
```

Figure 4C:
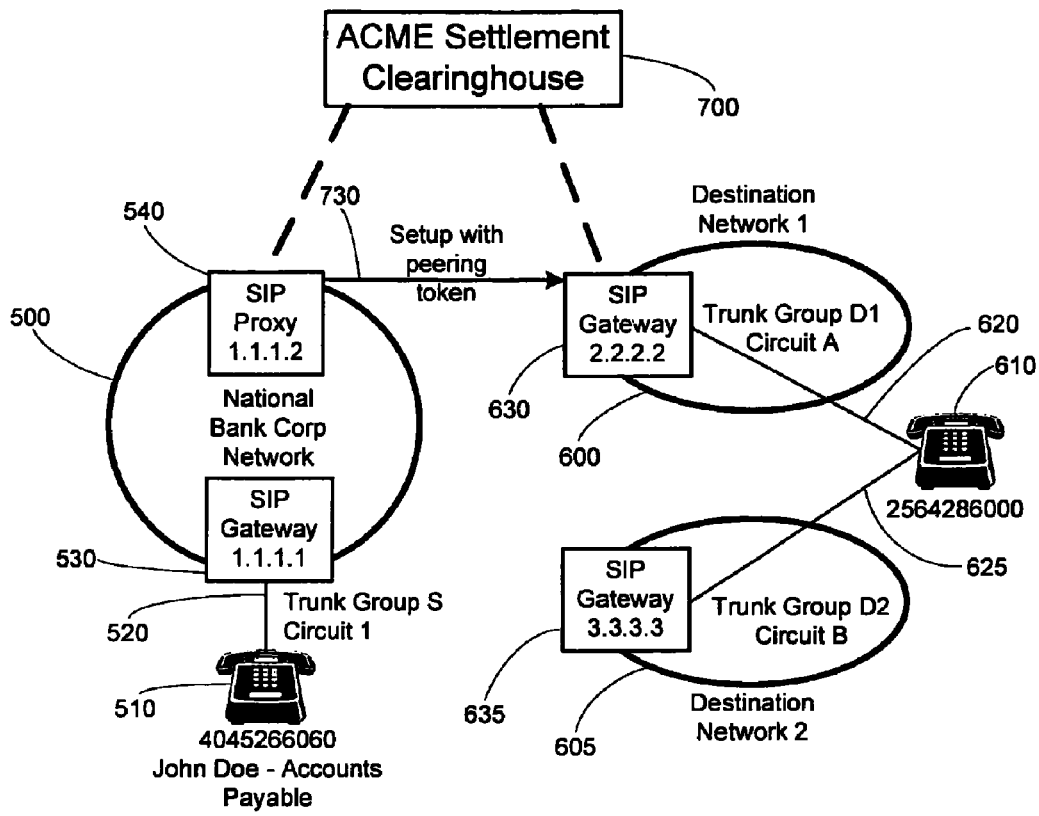
FIG. 4c is a functional block diagram illustrating an exemplary call setup message, with peering authorization token, between peers according to one exemplary embodiment of the invention.

When the source SIP Proxy 540 receives the peering authorization request 720 from the Clearinghouse 700, it extracts the peering authorization token and includes the token in the call setup message 730 to the destination network as illustrated in FIG. 4c. Specifically, the source SIP Proxy 540 sends a call setup message 730 to the SIP Gateway 630, in Destination Network 1 600. The token for Destination Network 1—600 is included in the call setup message 730.

The SIP Gateway 630 of the Destination Network 1—600 performs the steps below to validate that the call has been authorized by the ACME Settlement Clearinghouse and that the interconnect, or peering, terms are acceptable:
1. Validate the digital signature of the token using the public key of the ACME Settlement Clearinghouse certificate authority.
2. Validate the service authorized in the token is acceptable. If no service is defined in the token, it assumed to be voice.
3. Validate the quality of service level requested is acceptable. If not, the call must be rejected.
4. Validate the interconnect or peering price information.
   a. Amount
   b. Setup
   c. Increment
   d. Units
   e. Currency
   If the price information is not acceptable, the call should not be accepted.
5. Are the Calling Party Id and Source Network Id information acceptable? For example, the destination network may want to block the call based on the Authority or Verification level.

If the token is valid and its terms (interconnect rate, required quality of service, etc.) are acceptable, the destination SIP Gateway 630 accepts the call setup message 730 and completes the call to receiving party over Trunk Group D1 Circuit A 620 to the receiving party 610. If the call setup 730 was rejected by the destination SIP Gateway 630, the source SIP Proxy 540 would make a second attempt to complete the call destination SIP Gateway 635 of Destination Network 2—605. SIP Gateway 635 would also validate the token and assess if the peering terms were acceptable before accepting the call.

Accounting

Figure 4D:
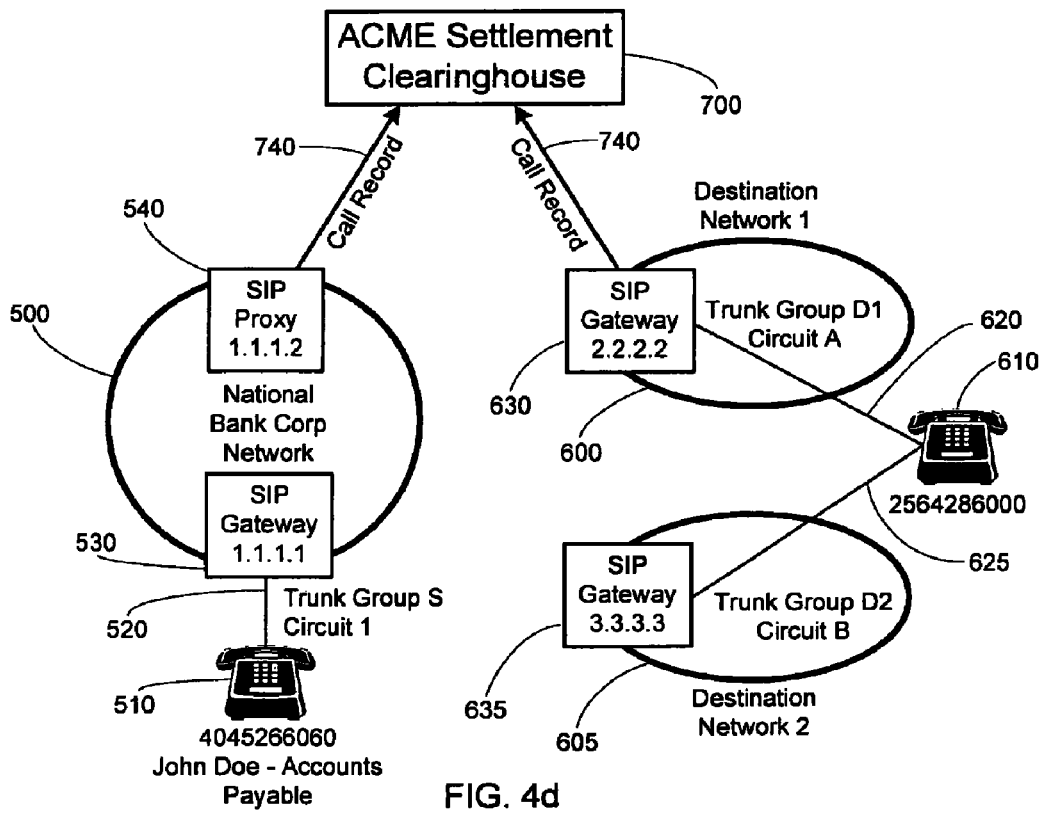
FIG. 4d is a functional block diagram illustrating exemplary peering accounting messages according to one exemplary embodiment of the invention.
Figure 4D:
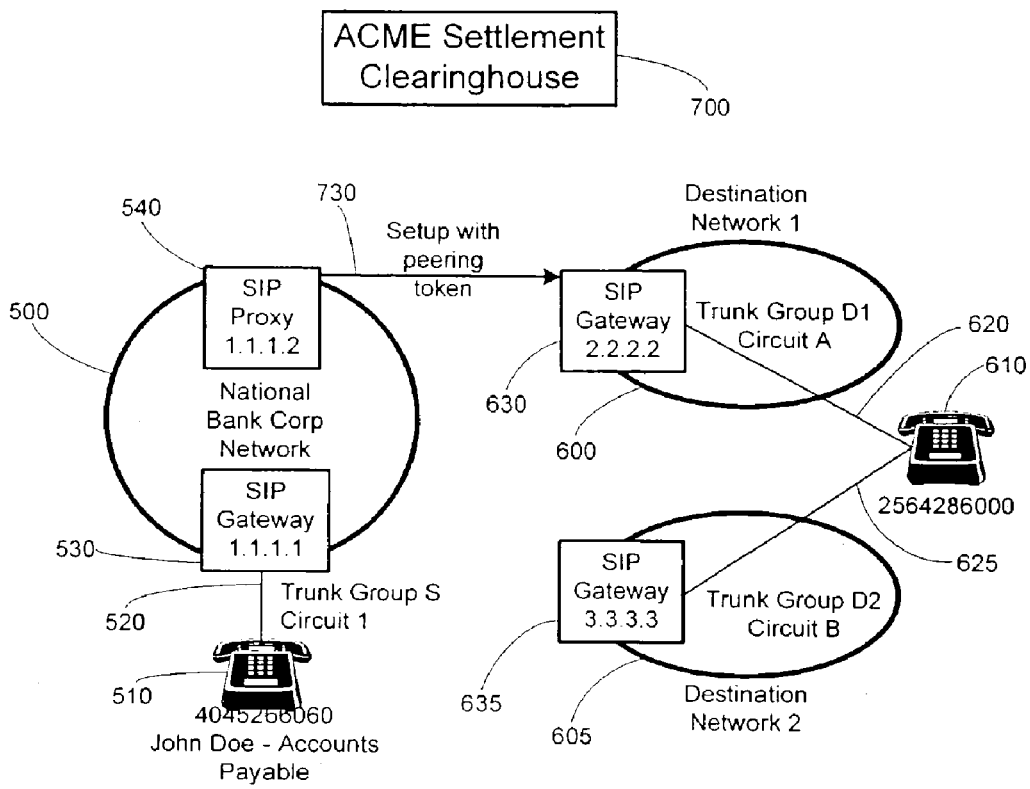
Figure 4E:
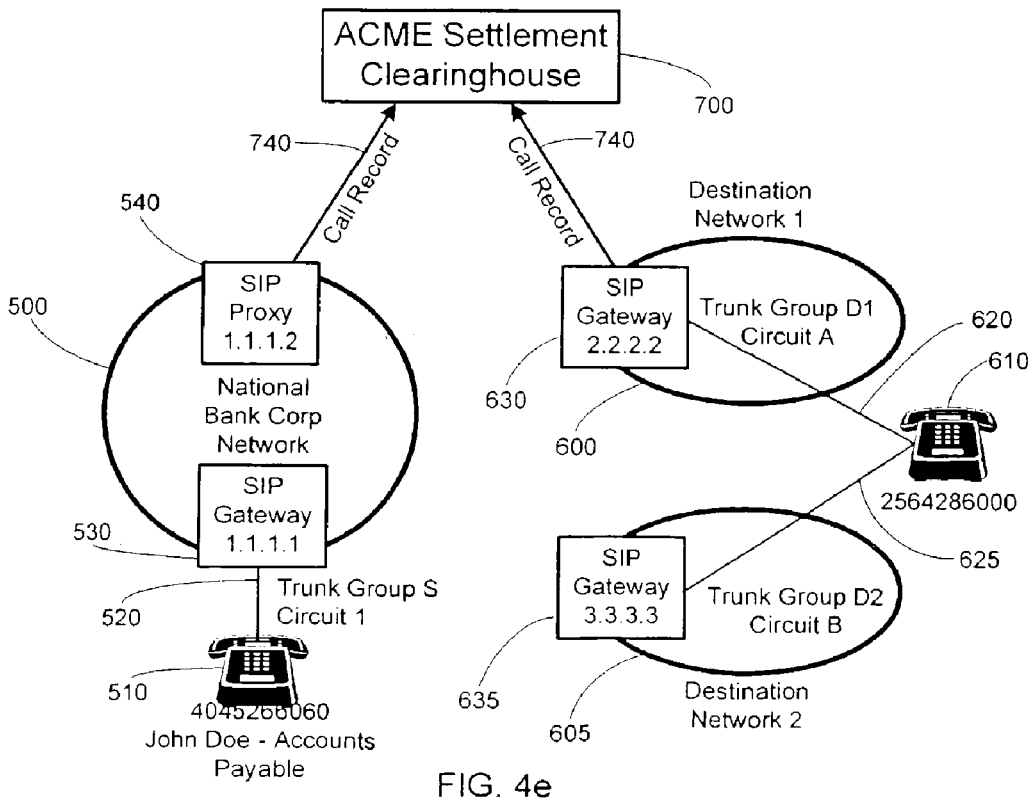

At the end of an interconnect VoIP call, or peering session, both the source and destination networks 600, 605 should report accounting records to the peering authority 700. As illustrated in FIG. 4d, the source SIP Proxy 540 sends a call record 740 to the ACME Settlement Clearinghouse 700 and the destination SIP Gateway 630 also sends a call record 740 to the ACME Settlement Clearinghouse 700. Below is an example of peering accounting message 740 from the Source SIP Proxy 540 to the ACME Settlement Clearinghouse 700:

```
POST /osp HTTP/1.1
Host: 172.16.4.78
content-type: text/plain
Content-Length: 1837
Connection: Keep-Alive
<?xml version="1.0"?>
<Message messageId="47331314891860973093" random="2730">
<UsageIndication componentId="47331314891860973092">
<Timestamp>2004-12-06T21:58:53Z</Timestamp>
<Role>source</Role>
<TransactionId>4733131489186097309</TransactionId>
<CallId encoding="base64">vIAeOEcIEdmUff2oaL5HDA==</CallId>
<SourceInfo type="e164">4045266060</SourceInfo>
<DeviceInfo type="transport">[1.1.1.1]</DeviceInfo>
<SourceAlternate type="network"> TrunkGrpS:1</SourceAlternate>
<SourceAlternate type="transport">[1.1.1.2]</SourceAlternate>
<DestinationInfo type="e164">2564286000</DestinationInfo>
<DestinationAlternate type="transport">[2.2.2.2]</DestinationAlternate>
<DestinationAlternate
type="network">TrunkGrpD1:A</DestinationAlternate>
<Group>
   <GroupId>BC801E38-4708-11D9-947D-FDA868BE470C</GroupId>
</Group>
<UsageDetail>
   <Service/>
   <Amount>300</Amount>
   <Increment>1</Increment>
   <Unit>s</Unit>
   <StartTime>2004-12-06T21:58:03Z</StartTime>
   <EndTime>2004-12-06T21:58:25Z</EndTime>
   <ConnectTime>2004-12-06T21:58:05Z</ConnectTime>
   <ReleaseSource>0</ReleaseSource>
</UsageDetail>
<PricingIndication>
   <Currency>USD</Currency>
   <Setup>0<Setup>
   <Amount>0.10</Amount>
   <Increment>60</Increment>
   <Unit>s</Unit>
</PricingIndication>
<CustomerId critical="False">1000</CustomerId>
<DeviceId critical="False">1000</DeviceId>
<FailureReason>1016</FailureReason>
<Statistics critical="False">
   <LossSent critical="False">
      <Packets critical="False">0</Packets>
      <Fraction critical="False">0</Fraction>
   </LossSent>
   <LossReceived critical="False">
      <Packets critical="False">0</Packets>
      <Fraction critical="False">0</Fraction>
   </LossReceived>
</Statistics>
</UsageIndication>
</Message>
```

Settlement

When the call, or peering session, accounting records 740 are collected, the ACME Settlement Clearinghouse 700 may then perform additional services for the source and destination peers such as interconnect billing, determination of net settlement payments among the peering, execution of any settlement payment transaction, analysis and reporting of inter-peer traffic statistics.

Other Applications of Peering in IP Communications

One of ordinary skill in the art of IP communications recognizes that the peering technique described above for VoIP applications could also be used in other IP applications that require peering between two networks, access control and accounting. A video call, which is a straight-forward extension of the VoIP call scenario described in detail, is an application which could benefit from the techniques described. Other peering applications include data file downloads, interactive gaming, application services or content brokering.

The following example illustrates how the invention can be used for applications other than VoIP. Assume the source network is a service provider offering on-line movie services to its end user subscribers. If the source network does not have the movie content requested by a subscriber (calling party), the source network can send a peering request to a content broker (clearinghouse) to request access to the network distributor of the requested movie. In this example, the network distributor is analogous to the destination network in the VoIP call scenario. The requested movie, or application, is analogous to the receiving party. The content broker would approve the peering request and create a peering token specifying the movie and requested bandwidth for the movie media stream.

The source network would then forward the peering token to the network distributor. The network distributor would then validate the peering token, identify the movie (application) requested and then provide the movie media stream to the source network. The source network would then redirect the movie stream to its end user. At the end of the movie media stream, the source network and network distributor would send their accounting records to the content broker who would facilitate billing and payment from the source network to the network distributor.

It should be understood that the foregoing relates only to illustrate the embodiments of the invention, and that numerous changes may be made therein without departing from the scope and spirit of the invention as defined by the following claims.

What is claimed is:

1. A method for securely authorizing VoIP interconnection between peers of VoIP networks:
   identifying the one or more second peer computer networks that are capable of completing a VoIP call originating from a first peer computer network;
   identifying peering criteria comprising price information for the VoIP call in an individual VoIP call authorization request;
   sending each individual VoIP call authorization request comprising the peering criteria to a peering authority;
   evaluating the peering criteria with the peering authority in which the peering authority compares prices in one or more pricing tables with the price for each individual VoIP call set forth in the peering criteria; and
   generating one or more tokens corresponding to the one or more second peer computer networks.

2. The method of claim 1, further comprising determining if a VoIP call originating from the first peer computer network must be completed by one or more second peer computer networks that are separate from the first computer network.

3. The method of claim 1, further comprising identifying peering criteria comprising at least one of bandwidth and network quality of service in an individual VoIP call authorization request.

4. The method of claim 1, further comprising completing the VoIP call with a token.

5. The method of claim 1, further comprising sending the one or more tokens to the first peer computer network; and sending a call setup request comprising a token from the first peer computer network to the second computer network.

6. The method of claim 1, wherein identifying one or more second peer computer networks further comprises reviewing available second peer computer networks stored in a routing table.

7. The method of claim 1, wherein identifying one or more second peer computer networks further comprises discovering second peer computer networks using route discovery protocols.

8. The method of claim 1, wherein evaluating the peering criteria further comprises identifying a type of service requested in the peering criteria.

9. The method of claim 1, wherein evaluating the peering criteria further comprises determining if pricing associated with the VoIP call are acceptable by one or more second peer computer networks.

10. The method of claim 1, wherein evaluating the peering criteria further comprises determining if quality of service associated with the peering criteria are acceptable by one or more second peer computer networks.

11. The method of claim 1, wherein evaluating the peering criteria further comprises comparing historical quality of service of the second computer network to the quality of service requested in the peering criteria.

12. A system for securely authorizing VoIP interconnection between devices of VoIP networks comprising:
    a first call point control device of a first computer network, for identifying one or more second peer computer networks that are capable of completing a VoIP call from a first telephone to a second telephone; the call point control device determining peering criteria comprising a price for the VoIP call; and
    a peering authority coupled to the call point control device, for receiving the peering criteria and evaluating the peering criteria, for generating one or more tokens corresponding to the one or more second peer computer networks based on the evaluation of the peering criteria, each token establishing price for the VoIP interconnection in accordance with the peering criteria, the first call point control device selecting a token and contacting a second call point control device on a second computer network associated with the selected token for completing the VoIP call with the token.

13. The system of claim 12, wherein the first call point control device determines if a VoIP call originating from a first telephone to a second telephone must be completed by one or more second computer networks that are separate from the first computer network.

14. The system of claim 12, wherein the peering criteria comprises at least one of bandwidth and a network quality of service for the VoIP call.

15. The system of claim 12, wherein each token further establishes at least one of bandwidth and quality of service for the VoIP interconnection in accordance with the peering criteria.

16. The system of claim 12, wherein the peering authority and first and second call point control devices comprise computer servers with IP addresses.

17. The system of claim 12, wherein the second call point control device receives the selected token and determines if the token is valid.

18. The system of claim 12, wherein the second call point device validates a digital signature of the token using a public key generated by the peering authority.

19. The system of claim 12, wherein the peering authority comprises a settlement clearing house.

20. The system of claim 19, wherein the settlement clearing house comprises a computer server.